United States Patent
Watanabe et al.

(10) Patent No.: US 12,248,186 B2
(45) Date of Patent: Mar. 11, 2025

(54) OPTICAL CONNECTOR JIG, OPTICAL CONNECTOR CONNECTION METHOD, AND OPTICAL CONNECTOR DISCONNECTION METHOD

(71) Applicant: SUMITOMO ELECTRIC INDUSTRIES, LTD., Osaka (JP)

(72) Inventors: Takuro Watanabe, Osaka (JP); Dai Sasaki, Osaka (JP); Hajime Arao, Osaka (JP); Tetsuya Nakanishi, Osaka (JP); Hong Chuyen Nguyen, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 248 days.

(21) Appl. No.: 17/925,717

(22) PCT Filed: Apr. 6, 2021

(86) PCT No.: PCT/JP2021/014653
§ 371 (c)(1),
(2) Date: Nov. 16, 2022

(87) PCT Pub. No.: WO2021/241013
PCT Pub. Date: Dec. 2, 2021

(65) Prior Publication Data
US 2023/0341636 A1    Oct. 26, 2023

(30) Foreign Application Priority Data
May 26, 2020   (JP) ................. 2020-091211

(51) Int. Cl.
*G02B 6/38* (2006.01)

(52) U.S. Cl.
CPC ........ *G02B 6/3898* (2013.01); *G02B 6/3879* (2013.01); *G02B 6/3885* (2013.01); *G02B 6/3888* (2021.05); *G02B 6/3883* (2013.01)

(58) Field of Classification Search
CPC .. G02B 6/3879; G02B 6/3883; G02B 6/3885; G02B 6/3888; G02B 6/3898
See application file for complete search history.

(56) References Cited

U.S. PATENT DOCUMENTS 9,606,300 B2 * 3/2017 Sasaki .................. G02B 6/3882
2009/0245736 A1 10/2009 Ahadian et al.
(Continued)

FOREIGN PATENT DOCUMENTS

JP    S60165606 A * 8/1985 ............... G02B 6/36
JP    H04-087808 U   7/1992
(Continued)

*Primary Examiner* — Daniel Petkovsek
(74) *Attorney, Agent, or Firm* — Oliff PLC

(57) ABSTRACT

An optical connector jig for connecting a second optical connector to a first optical connector, or disconnecting the second optical connector from the first optical connector, includes a first housing and a second housing. The first housing includes a positioning portion to determine a position of the jig with respect to the first optical connector in cooperation with a member indicating a position of the first optical connector. The second housing grips the second optical connector such that, when the jig is positioned with respect to the first optical connector, a connection surface of the second optical connector faces a connection surface of the first optical connector. The second housing moves with respect to the first housing such that the connection surface of the gripped second optical connector is close to or away from the connection surface of the first optical connector.

9 Claims, 17 Drawing Sheets

(56) References Cited

U.S. PATENT DOCUMENTS

| | | | | |
|---|---|---|---|---|
| 2012/0027359 A1* | 2/2012 | Katoh | ............... | G02B 6/3885 |
| | | | | 385/78 |
| 2012/0141070 A1* | 6/2012 | Sabo | ............... | G02B 6/4257 |
| | | | | 385/60 |
| 2015/0346438 A1* | 12/2015 | Kato | ............... | G02B 6/387 |
| | | | | 385/59 |
| 2018/0052285 A1 | 2/2018 | Barwicz et al. | | |
| 2023/0350134 A1* | 11/2023 | Watanabe | ............ | G02B 6/3897 |

FOREIGN PATENT DOCUMENTS

| | | | |
|---|---|---|---|
| JP | H05-119239 A | 5/1993 | |
| JP | H08-262270 A | 10/1996 | |
| JP | H11-326691 A | 11/1999 | |

\* cited by examiner

OPTICAL CONNECTOR JIG, OPTICAL CONNECTOR CONNECTION METHOD, AND OPTICAL CONNECTOR DISCONNECTION METHOD

TECHNICAL FIELD

The present disclosure relates to an optical connector jig, an optical connector connection method, and an optical connector disconnection method. This application is based upon and claims the benefit of priority from Japanese Patent Application No. 2020-091211, filed on May 26, 2020, the entire contents of which are incorporated herein by reference.

BACKGROUND ART

Patent Literature 1 discloses an optical connector that collectively connects a plurality of optical fibers to each other. This optical connector is attached, for example, to an edge of a board of a transmission device.

CITATION LIST

Patent Literature

[Patent Literature 1] Japanese Unexamined Patent Publication No. H5-119239

SUMMARY OF INVENTION

As one aspect, the present disclosure provides an optical connector jig. This optical connector jig is an optical connector jig for connecting a second optical connector to which a tip end portion of at least one second optical cable is attached to a first optical connector which is disposed on a main surface of a board and to which a tip end portion of at least one first optical cable is attached, or disconnecting the second optical connector connected to the first optical connector from the first optical connector. This optical connector jig includes a first housing and a second housing. The first housing includes a positioning portion to determine a position of the optical connector jig with respect to the first optical connector in cooperation with a member indicating a position of the first optical connector. The second housing is able to grip the second optical connector such that, when the optical connector jig is positioned with respect to the first optical connector, a connection surface of the second optical connector faces a connection surface of the first optical connector. The second housing is able to move with respect to the first housing such that the connection surface of the gripped second optical connector is close to the connection surface of the first optical connector or is away from the connection surface of the first optical connector.

As another aspect, the present disclosure provides an optical connector connection method. This optical connector connection method is a method for connecting the second optical connector to the first optical connector by using the above optical connector jig. This connection method includes gripping the second optical connector by the second housing such that the connection surface of the second optical connector faces the first housing, positioning the optical connector jig with respect to the first optical connector by using the positioning portion of the first housing and the member indicating a position of the first optical connector, and moving the second housing toward the first housing to connect the second optical connector to the first optical connector.

As still another aspect, the present disclosure provides an optical connector disconnection method. This optical connector disconnection method is a method for disconnecting the second optical connector connected to the first optical connector from the first optical connector by using the above optical connector jig. The optical connector jig used for this disconnection method further includes an ejector disposed between the first housing and the second housing, wherein the ejector includes a releasing portion that is able to release the connection between the first optical connector and the second optical connector by the ejector being moved away from the first housing. This disconnection method includes positioning the optical connector jig with respect to the first optical connector by using the positioning portion of the first housing and the member indicating a position of the first optical connector and gripping the second optical connector connected to the first optical connector by the second housing, and releasing the connection between the first optical connector and the second optical connector with the releasing portion by moving the ejector away from the first housing.

DESCRIPTION OF EMBODIMENTS

Figure 1:
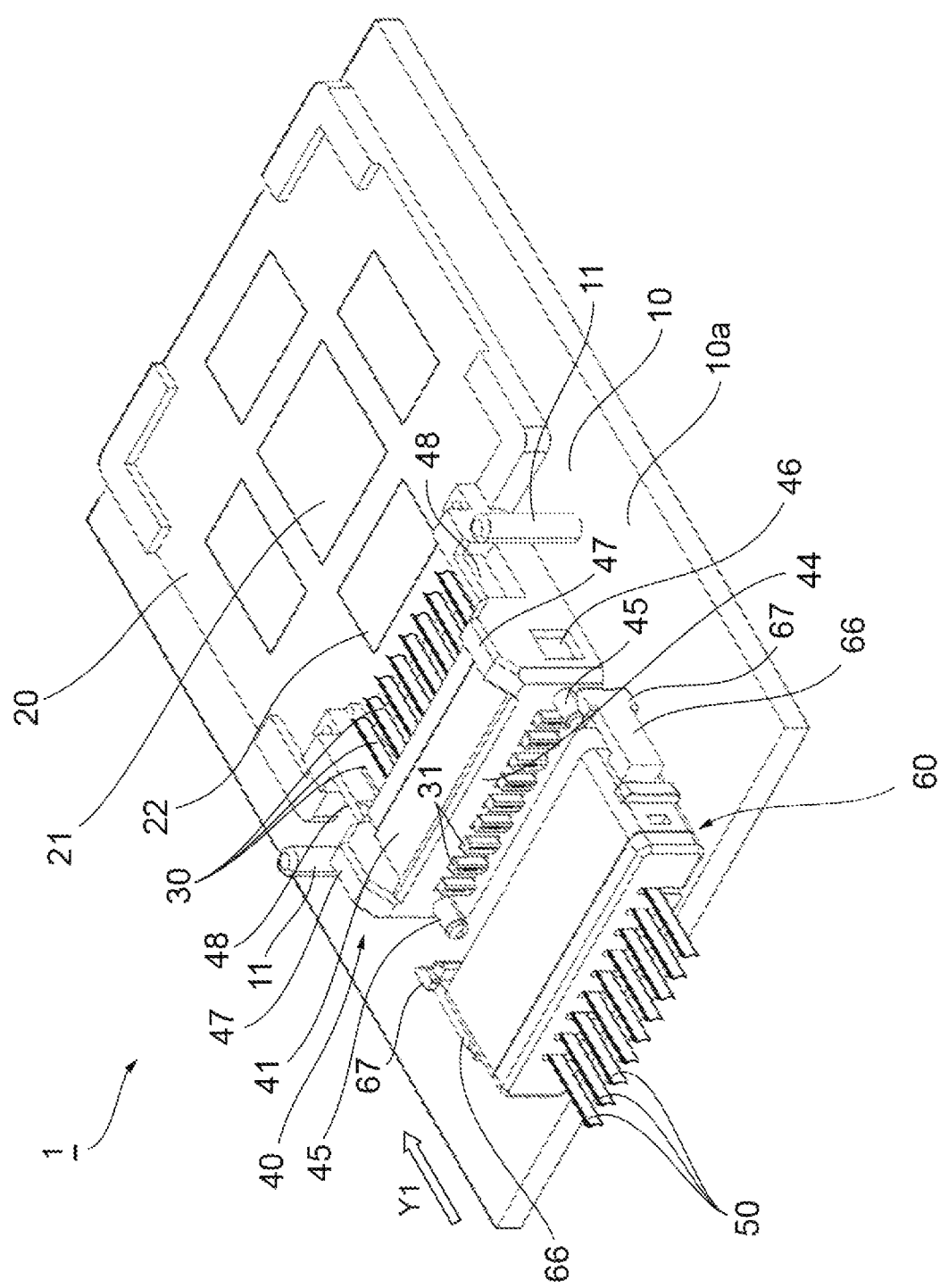
FIG. 1 is a perspective view of an optical apparatus according to an embodiment and illustrates the optical apparatus in a state before a second optical connector is connected to a first optical connector.

Problems to be Solved by the Present Disclosure

When an electrical signal from an integrated circuit such as an application-specific integrated circuit (ASIC) is converted into an optical signal in a communication apparatus or the like, a plurality of internal optical fibers for transmitting the converted optical signal to the outside of the apparatus are collectively connected to a plurality of optical fibers outside the apparatus. For example, an optical connector described in Patent Literature 1 is used for this collective connection. In such a communication apparatus, it is desired to convert an electrical signal from an integrated circuit into an optical signal at a position closer to the integrated circuit as the amount of data communication increases. However, since there is no spare space in the vicinity of the ASIC, a connecting work or a disconnecting work of the optical connector has to be performed by directly gripping a small optical connector in a narrow space on a board on which the ASIC is mounted, which is very difficult. Therefore, it is desired that the connecting work or the disconnecting work of such optical connectors can be easily performed.

Effects of the Present Disclosure

According to the present disclosure, as an aspect, it is possible to easily connect or disconnect the optical connectors to or from each other.

Description of Embodiments of the Present Disclosure

First, the content of embodiments of the present disclosure will be listed and described. An optical connector jig according to an embodiment is an optical connector jig for connecting a second optical connector to which a tip end portion of at least one second optical cable is attached to a first optical connector to which a tip end portion of at least one first optical cable disposed on a main surface of a board is attached, or disconnecting the second optical connector connected to the first optical connector from the first optical connector. This optical connector jig includes a first housing and a second housing. The first housing includes a positioning portion to determine a position of the optical connector jig with respect to the first optical connector in cooperation with a member indicating a position of the first optical connector. The second housing is able to grip the second optical connector such that, when the optical connector jig is positioned with respect to the first optical connector, a connection surface of the second optical connector faces a connection surface of the first optical connector. The second housing is able to move with respect to the first housing such that the connection surface of the gripped second optical connector is close to the connection surface of the first optical connector or is away from the connection surface of the first optical connector.

In the optical connector jig, the first housing includes the positioning portion to position the optical connector jig with respect to the first optical connector, and the second housing gripping the second optical connector can be moved with respect to the first housing such that the connection surface of the second optical connector is close to the connection surface of the first optical connector or is away from the connection surface of the first optical connector. In this case, simply by gripping the second optical connector with the second housing and positioning the optical connector jig and then moving the second housing with respect to the first housing, it is possible to connect the second optical connector to the first optical connector or to disconnect the second optical connector from the first optical connector. Therefore, by using this optical connector jig, it is possible to easily connect the second optical connector to the first optical connector as compared with the case where the first optical connector and the second optical connector disposed on the main surface of the board are directly gripped by hand or the like to be connected to each other.

As an embodiment, the positioning portion may include a hole or a protrusion corresponding to a protrusion or a hole that is provided on at least one of the board and the first optical connector and is the member indicating a position of the first optical connector. According to this aspect, the positioning portions can be realized with a simpler configuration. In this aspect, the positioning portion may include a placing surface on which the first housing is able to be placed on the main surface of the board, and the corresponding hole or protrusion may be provided on the placing surface. According to this aspect, by bringing the main surface of the board and the placing surface into face-to-face contact with each other, it is possible to adjust the inclination of the optical connector jig in the horizontal direction with respect to the board and to more accurately position the optical connector jig with respect to the first optical connector.

As an embodiment, the first housing may be provided with an opening portion that is able to receive at least a part of the first optical connector, and at least one of a recess that is able to accommodate a protrusion of the first optical connector and a protrusion that is able to be accommodated in the recess of the first optical connector may be formed in the opening portion. According to this aspect, the first housing of the optical connector jig can receive a force applied to the first optical connector when the second optical connector is moved closer to the first optical connector by the second housing of the optical connector jig, and thus a force applied the connection portion between the first optical connector and the board can be dispersed to protect the installation of the first optical connector on the board or the like. According to this aspect, it assists with a positioning work that is performed mainly by the member indicating the position of the first optical connector and the positioning portion of the first housing, and thus it is possible to perform the positioning more accurately or a positioning operation more smoothly.

As an embodiment, the optical connector jig may further include a shaft part including one end fixed to the first housing and penetrating the second housing toward the other end opposite to the one end, and a bearing part to which the other end of the shaft part is fixed. The second housing may be slidable relative to the first housing along the shaft part between the first housing and the bearing part. According to this aspect, the movement of the second housing with respect to the first housing can be made smooth along the shaft part, and the second optical connector can be more easily connected to the first optical connector. Since the second optical connector can be connected to the first optical connector along the shaft part, it is possible to reduce connection loss due to optical axis misalignment occurring when the optical cables are optically connected to each other.

As an embodiment, the optical connector jig may further include an ejector disposed between the first housing and the second housing, wherein the ejector may have a releasing portion that is able to release the connection between the first optical connector and the second optical connector by the ejector being moved away from the first housing. According to this aspect, it is possible to easily disconnect the second optical connector connected to the first optical connector from the first optical connector without directly gripping the first optical connector or the second optical connector disposed on the main surface for operating.

As an embodiment, the ejector may have a pair of side walls facing each other, and the releasing portion may be provided inside each of the pair of side walls near the first optical connector. Further, the releasing portion may be each of a pair of protrusions protruding away from the first housing. In this case, by moving the ejector away from the first housing (toward the second housing), the pair of protrusions, which are the releasing portions, enter the engaged portion between the first optical connector and the second optical connector to release the engagement, as a result, it is possible to easily disconnect the second optical connector connected to the first optical connector from the first optical connector. By forming the releasing portions from the pair of protrusions, it is possible to disconnect the optical connector with a simple structure.

As an embodiment, the ejector may have a pair of side walls facing each other, and each of the pair of side walls may have a recess recessed outward and a pressing surface located at an edge of the recess, the edge being adjacent to the second housing. According to this aspect, when connecting the second optical connector to the first optical connector, it becomes easier to temporarily spread the latch of the second optical connector outward. Therefore, the second optical connector can be connected to the first optical connector more smoothly.

An optical connector connection method according to an embodiment is a method for connecting the second optical connector to the first optical connector by using the optical connector jig according to any one of the above-described embodiments. This connection method includes gripping the second optical connector by the second housing such that the connection surface of the second optical connector faces the first housing, positioning the optical connector jig with respect to the first optical connector by using the positioning portion of the first housing and the member indicating a position of the first optical connector, and moving the second housing toward the first housing to connect the second optical connector to the first optical connector.

In this optical connector connection method, the second optical connector is gripped by the second housing to face in a predetermined direction, and the optical connector jig is positioned with respect to the first optical connector. After such setting is made, by moving the second housing toward the first housing, the optical connectors are connected to each other. Therefore, it is possible to easily connect the optical connectors (that is, the optical fibers or the optical cables) to each other by operating the first housing and the second housing without directly gripping the first optical connector or the second optical connector disposed on the main surface for operating.

An optical connector disconnection method according to an embodiment is a method for disconnecting the second optical connector connected to the first optical connector from the first optical connector by using the optical connector jig, which includes the ejector, according to any one of the above-described embodiments. This disconnection method includes positioning the optical connector jig with respect to the first optical connector by using the positioning portion of the first housing and the member indicating a position of the first optical connector and gripping the second optical connector connected to the first optical connector by the second housing, and releasing the connection between the first optical connector and the second optical connector with the releasing portion by moving the ejector away from the first housing.

In the optical connector disconnection method, by moving the ejector away from the first housing, the releasing portion of the ejector releases the engagement between the first optical connector and the second optical connector. Therefore, the separation of the first optical connector and the second optical connector does not require a complicated work, and the connection between the optical connectors can be easily released and disconnected.

Details of Embodiments of the Present Disclosure

Specific examples of an optical connector jig, an optical connector connection method, and an optical connector disconnection method according to the present disclosure will be described below with reference to the drawings. The present invention is not limited to these examples, but is defined by the scope of the claims, and is intended to include meanings equivalent to the scope of the claims and all modifications within the scope. In the description of the drawings, the same elements will be denoted by the same reference signs, and duplicate description will be omitted.

Figure 2:
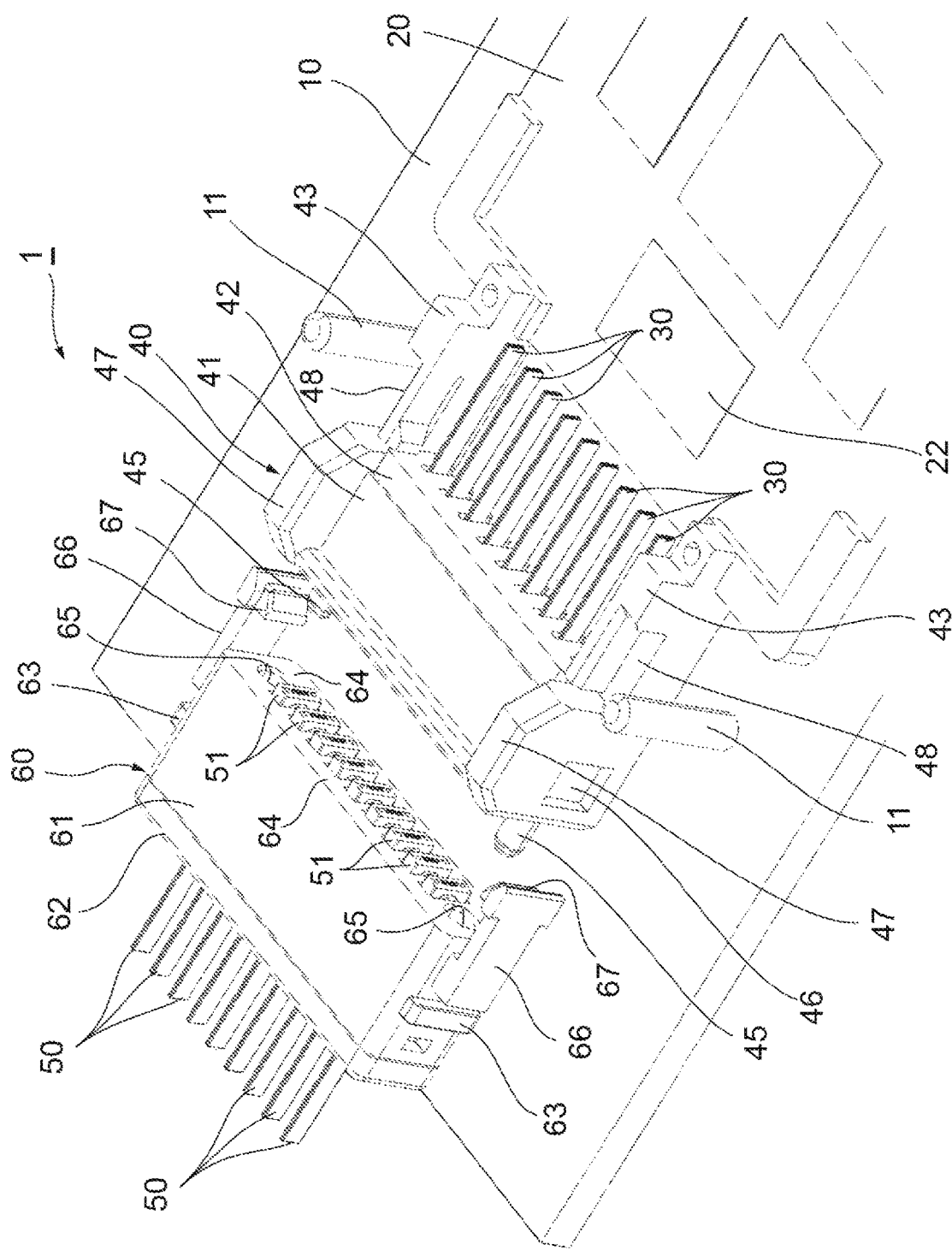
FIG. 2 is a perspective view of the optical apparatus shown in FIG. 1 from a side of a package.
Figure 3:
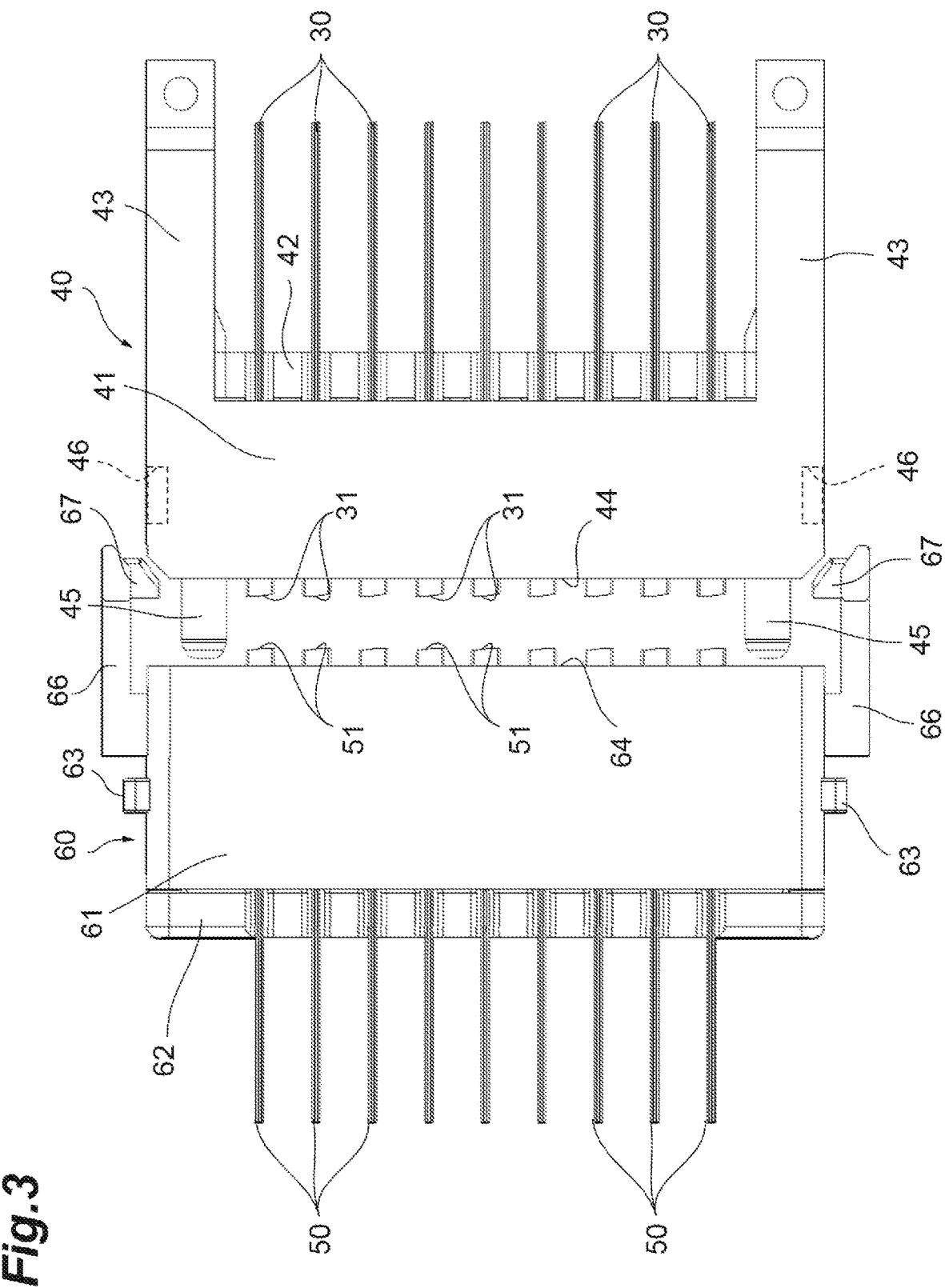
FIG. 3 is a bottom view of the first connector and the second connector of the optical apparatus shown in FIG. 1 from below.

First, the overall configuration of an optical apparatus 1 in which the optical connector jig according to an embodiment of the present disclosure is used will be described with reference to FIGS. 1 to 3. FIG. 1 is a perspective view showing the optical apparatus 1 according to an embodiment. FIG. 2 is an enlarged perspective view of the optical apparatus 1 shown in FIG. 1 from a side of a package 20. FIG. 3 is a bottom view of a first connector and a second connector of the optical apparatus 1 shown in FIG. 1 from below. As shown in FIGS. 1 to 3, the optical apparatus 1 includes a board 10, a package 20, a plurality of first optical cables 30, a first optical connector 40, a plurality of second optical cables 50, and a second optical connector 60. In the optical apparatus 1, the second optical connector 60 to which the plurality of second optical cables 50 are attached is connected to the first optical connector 40 to which the plurality of first optical cables 30 are attached (see FIG. 5), and optical signals photoelectrically converted in the package 20 are transmitted to an external optical apparatus through the first optical cables 30 and the second optical cables 50.

The board 10 is, for example, a printed circuit board and has a main surface 10a. The package 20 and the first optical connector 40 are disposed and fixed on the main surface 10a. In a case where the second optical connector 60 is not connected to the first optical connector 40, the second optical connector 60 is not fixed to the board 10 and is in a free state. A pair of positioning pins 11 are provided on the main surface 10a of the board 10. The pair of positioning pins 11 are positioned such that the first optical connector 40 is sandwiched therebetween and function as members indicating a position of the first optical connector 40. A positioning portion 112 (see FIG. 6) of the optical connector jig 100, which will be described later, is used to determine a position of the optical connector jig 100 with respect to the first optical connector 40 in cooperation with the pair of positioning pins 11. The pair of positioning pins 11, which are members indicating a position of the first optical connector 40, may be directly provided in the first optical connector 40.

The package 20 is a module mounted on the main surface 10a of the board 10 which is a printed circuit board, and includes an integrated circuit 21 and an optical device 22. The integrated circuit 21 is an integrated circuit such as an application-specific integrated circuit (ASIC), for example, and outputs predetermined electrical signals. The optical device 22 is a device that converts electrical signals from the integrated circuit 21 into optical signals. Electrical signals sent out from the integrated circuit 21 are converted into optical signals by the optical device 22 and then are sent out to the plurality of first optical cables 30 optically connected to the optical device 22.

The first optical cables 30 are cables that transmit optical signals sent from the optical device 22, and each first optical cable 30 is formed of an optical fiber ribbon having a plurality of optical fibers. The first optical cable 30 has a first end portion optically connected to the optical device 22 and a second end portion (a tip end portion) attached to the first optical connector 40. Although the optical apparatus 1 including eight first optical cables 30 is shown as an example in the present embodiment, the present invention is not limited to this. Although it is sufficient if at least one or more first optical cables 30 are provided, the optical apparatus 1 generally includes a plurality of first optical cables 30. Each optical fiber ribbon forming the first optical cable 30 has, for example, 12, 24 (12×2 rows), or 36 (12×3 rows) optical fibers. The optical fiber ribbon is a fiber ribbon in which a plurality of optical fibers are arranged and peripheries thereof are collectively coated with an ultraviolet curable resin.

Figure 4:
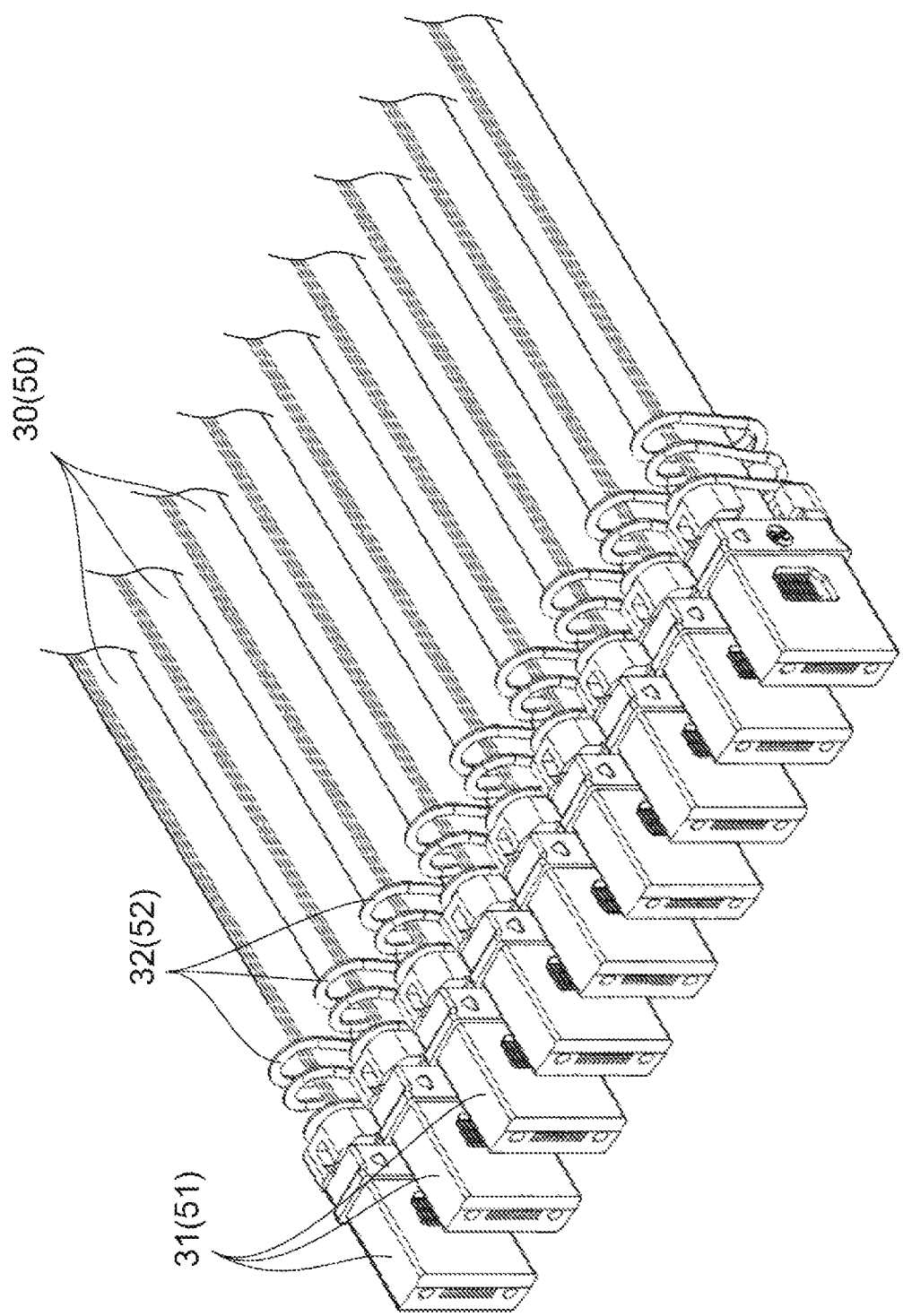
FIG. 4 is a perspective view showing a plurality of first optical cables and a plurality of second optical cables.

A ferrule 31 is attached to the second end portion (the tip end portion) of the first optical cable 30, as shown in FIG. 4. An end portion of the optical fiber ribbon with a coating thereof peeled off is received in the ferrule 31. The ferrule 31 is, for example, an MT ferrule corresponding to a multifiber-type optical fiber ribbon. A plurality of ferrules 31 are received in a plurality of receiving portions provided in the first optical connector 40, respectively, and tip ends thereof protrude outward from a connection surface 44 of the first optical connector 40. The plurality of ferrules 31 are urged forward by elastic members 32 such as springs, but are held such that only tip end portions thereof are exposed to the outside by being stopped by engaging portions in the receiving portions of the first optical connector 40.

As shown in FIGS. 1 to 3, the first optical connector 40 is a member that holds the tip end portions of the plurality of first optical cables 30 such that the tip end portions (the ferrules 31) of the plurality of first optical cables 30 are exposed forward from the connection surface 44 and is used to collectively connect the plurality of first optical cables 30 to the plurality of second optical cables 50. The first optical connector 40 is disposed and fixed on the main surface 10a of the board 10. The first optical connector 40 includes a main body portion 41, a fitting portion 42, a pair of leg portions 43, a connection surface 44, a pair of pins 45, a pair of recesses 46, a pair of protrusions 47, and a pair of recesses 48.

The main body portion 41 is a portion extending in a direction in which the plurality of first optical cables 30 are arranged (a width direction), and has a plurality of receiving portions (through holes) that can receive the ferrules 31 attached to the tip end portions of the plurality of first optical cables 30 therein. The fitting portion 42 is a member that presses and fastens the ferrules 31 received from behind in the receiving portions of the main body portion 41 from behind with the elastic member 32. The fitting portion 42 is configured such that tip end portions thereof are inserted into the receiving portions of the main body portion 41. The pair of leg portions 43 are portions extending rearward from both ends in the width direction of the main body portion 41, and rear ends of the pair of leg portions 43 are laid on the package 20 and are fixed to the package 20 with screws or the like. The first optical connector 40 may be directly fixed to the main surface 10a of the board 10.

The connection surface 44 is a front end surface provided on a front side of the main body portion 41, and includes openings through which the ferrules 31 attached to the tip end portions of the plurality of first optical cables 30 are exposed. The connection surface 44 faces a connection surface 64 of the second optical connector 60. The pair of pins 45 are provided at both ends of the connection surface 44. The pair of pins 45 protrude toward the second optical connector 60 and are configured to be engageable with a pair of holes 65 of the second optical connector 60. When the pair of pins 45 engage with the pair of holes 65 of the second optical connector 60, optical axis alignment between the first optical cables 30 held by the first optical connector 40 and the second optical cables 50 held by the second optical connector 60 is performed.

The pair of recesses 46 are provided on both side surfaces of the main body portion 41 in the width direction and are portions for engaging with engaging portions 67 of a pair of latches 66 of the second optical connector 60. The pair of recesses 46 are formed to be recessed toward the inside of the main body portion 41. By the engaging portions 67 of the pair of latches 66 of the second optical connector 60 being engaged with the pair of recesses 46, respectively, the second optical connector 60 is appropriately connected to the first optical connector 40. That is, each second optical cable 50 held by the optical connector 60 is optically connected to each first optical cable 30 held by the first optical connector 40.

The pair of protrusions 47 are wall portions provided to protrude upward from both ends of the main body portion 41 in the width direction. The pair of protrusions 47 are received in recesses 117 of a first housing 110 of the optical connector jig 100, which will be described later, when the second optical connector 60 is connected to the first optical connector 40 or when the second optical connector 60 is disconnected from the first optical connector 40 (see FIG. 8). The pair of recesses 48 are cutouts provided on an outer side of each leg portion 43 and closed to the main body portion 41. Similar to the pair of protrusions 47, shoulder portions 118 of the first housing 110 of the optical connector jig 100 are received in the pair of recesses 48, when the second optical connector 60 is connected to the first optical connector 40 or when the second optical connector 60 is disconnected from the first optical connector 40. The pair of protrusions 47 and the pair of recesses 48 assist the pair of pins 11 used for alignment with the optical connector jig 100 and assist with the positioning of the optical connector jig 100 with respect to the first optical connector 40.

As shown in FIG. 4, the second optical cable 50 has the same configuration as the first optical cable 30, is formed of an optical fiber ribbon having a plurality of optical fibers. The second optical cable 50 has a first end portion drawn out toward the outside of the optical apparatus 1 and a second end portion (a tip end portion) attached to the second optical connector 60. Although it is sufficient if at least one or more second optical cables 50 are provided, the optical apparatus 1 generally includes a plurality of second optical cables 50. A ferrule 51 is attached to the second end portion of the second optical cable 50. An end portion of the optical fiber ribbon with a coating thereof peeled off is received in the ferrule 51. A plurality of ferrules 51 are received in a plurality of receiving portions provided in the second optical connector 60, and tip ends thereof protrude from the connection surface 64 of the second optical connector 60. The plurality of ferrules 51 are urged forward by elastic members 52 such as springs, but are held such that only tip end portions thereof are exposed to the outside by being stopped by engaging portions in the receiving portions of the second optical connector 60. In the description of the second optical cable 50 and the second optical connector 60, a side of the first optical cable 30 and the first optical connector 40 will be referred to as a forward side or a tip end, and a side opposite thereto will be referred to as a rearward side.

As shown in FIGS. 1 to 3, the second optical connector 60 is a member that holds the tip end portions of the plurality of second optical cables 50 such that the tip end portions (the ferrules 51) of the plurality of second optical cables 50 are exposed forward from the connection surface 64, and is used to collectively connect the plurality of second optical cables 50 to the plurality of first optical cables 30. The second optical connector 60 is attached to the board 10 with the first optical connector 40 by being connected to the first optical connector 40. The second optical connector 60 includes a main body portion 61, a fitting portion 62, a pair of protruding portions 63, the connection surface 64, the pair of holes 65, and the pair of latches 66. A tip end of each latch 66 is provided with the engaging portion 67 protruding inward.

The main body portion 61 is a portion extending in a direction in which the plurality of second optical cables 50 are arranged (a width direction), and has a plurality of receiving portions (through holes) that can receive the ferrules 51 attached to the tip end portions of the plurality of second optical cables 50 therein. The fitting portion 62 is a member that presses and fastens the ferrules 51 received from behind in the receiving portions of the main body portion 61 from behind with a the elastic member 52. The fitting portion 62 is configured such that tip end portions thereof are inserted into the receiving portions of the main body portion 61. The pair of protruding portions 63 are portions that extend in a vertical direction along the surfaces of both ends of the main body portion 61 in the width direction. The pair of protruding portions 63 are received in slits 137 in a second housing 130 of the optical connector jig 100 when the second optical connector 60 is connected to the first optical connector 40 or when the second optical connector 60 is disconnected from the first optical connector 40 by using the optical connector jig 100.

The connection surface 64 is a surface provided on a front side of the main body portion 61 (close to the first optical connector 40), and includes openings through which the ferrules 51 attached to the tip end portions of the plurality of second optical cables 50 are exposed. The connection surface 64 faces the connection surface 44 of the first optical connector 40. The pair of holes 65 are provided at both ends of the connection surface 64. The pair of holes 65 are recessed toward the rear of the second optical connector 60 and are configured to be engageable with a pair of pins 45 of the first optical connector 40. The pair of holes 65 are axis alignment members for performing optical axis alignment between the first optical cable 30 held by the first optical connector 40 and the second optical cable 50 held by the second optical connector 60 when the pair of holes 65 engage with the pair of pins 45 of the first optical connector 40.

The pair of latches 66 are members provided on both side surfaces of the main body portion 61 in the width direction and extending toward the first optical connector 40, and are provided with the engaging portions 67 at the tip ends thereof. The engaging portions 67 of the latches 66 engage with the pair of recesses 46 of the first optical connector 40. The engaging portions 67 of the pair of latches 66 are formed to protrude inward. By the engaging portions 67 of the pair of latches 66 of the second optical connector 60 being engaged with the pair of recesses 46, the second optical connector 60 is appropriately connected to the first optical connector 40. That is, each second optical cable 50 held by the optical connector 60 is optically connected to each first optical cable 30 held by the first optical connector 40.

Figure 5:
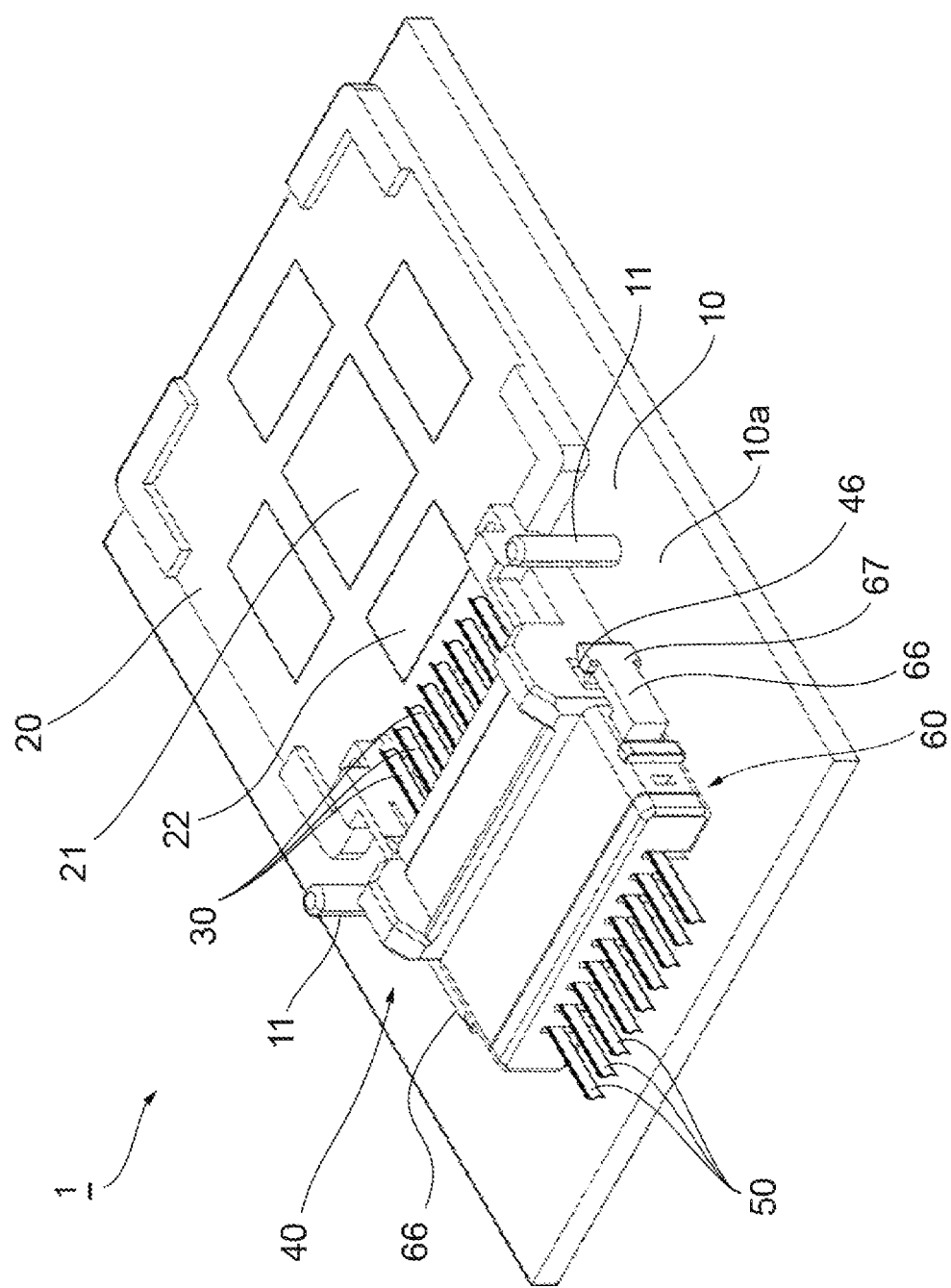
FIG. 5 is a perspective view of the optical apparatus shown FIG. 1 and illustrates the optical apparatus in a state after the second optical connector is connected to the first optical connector.

Next, a method of connecting the first optical connector 40 and the second optical connector 60 to each other will be described with reference to FIGS. 1, 2 and 5. Here, FIGS. 1 and 2 show a state before the second optical connector 60 is connected to the first optical connector 40, and FIG. 5 shows a state after the second optical connector 70 is connected to the first optical connector 40.

As shown in FIGS. 1 and 2, first, the second optical connector 60 is positioned such that the connection surface 64 of the second optical connector 60 faces the connection surface 44 of the first optical connector 40. At this time, each ferrule 51 held by the second optical connector 60 is disposed to face the corresponding ferrule 31 of the first optical connector 40 (see FIG. 3). Next, the second optical connector 60 is moved along the main surface 10a of the board 10 toward the first optical connector 40 (in a direction of arrow Y1 in FIG. 1). When the second optical connector 60 moves to a predetermined position, the engaging portion 67 formed at the tip end of the latch 66 of the second optical connector 60 is engaged with each recess 46 provided on the side surface of the first optical connector 40, and the first optical connector 40 and the second optical connector 60 are connected to each other (see FIG. 5). By the first optical connector 40 and the second optical connector 60 being connected to each other, each first optical cable 30 and each second optical cable 50 accommodated and held in each optical connector are optically connected to each other.

On the other hand, when the second optical connector 60 connected to the first optical connector 40 is disconnected from the first optical connector 40, each engaging portion 67 of the latch 66 engaged with the recess 46 is pushed and spread outward, and the engagement with the recess 46 is released. After that, the second optical connector 60 is moved away from the first optical connector 40 (rearward). The second optical connector 60 is thereby disconnected from the first optical connector 40.

Figure 6:
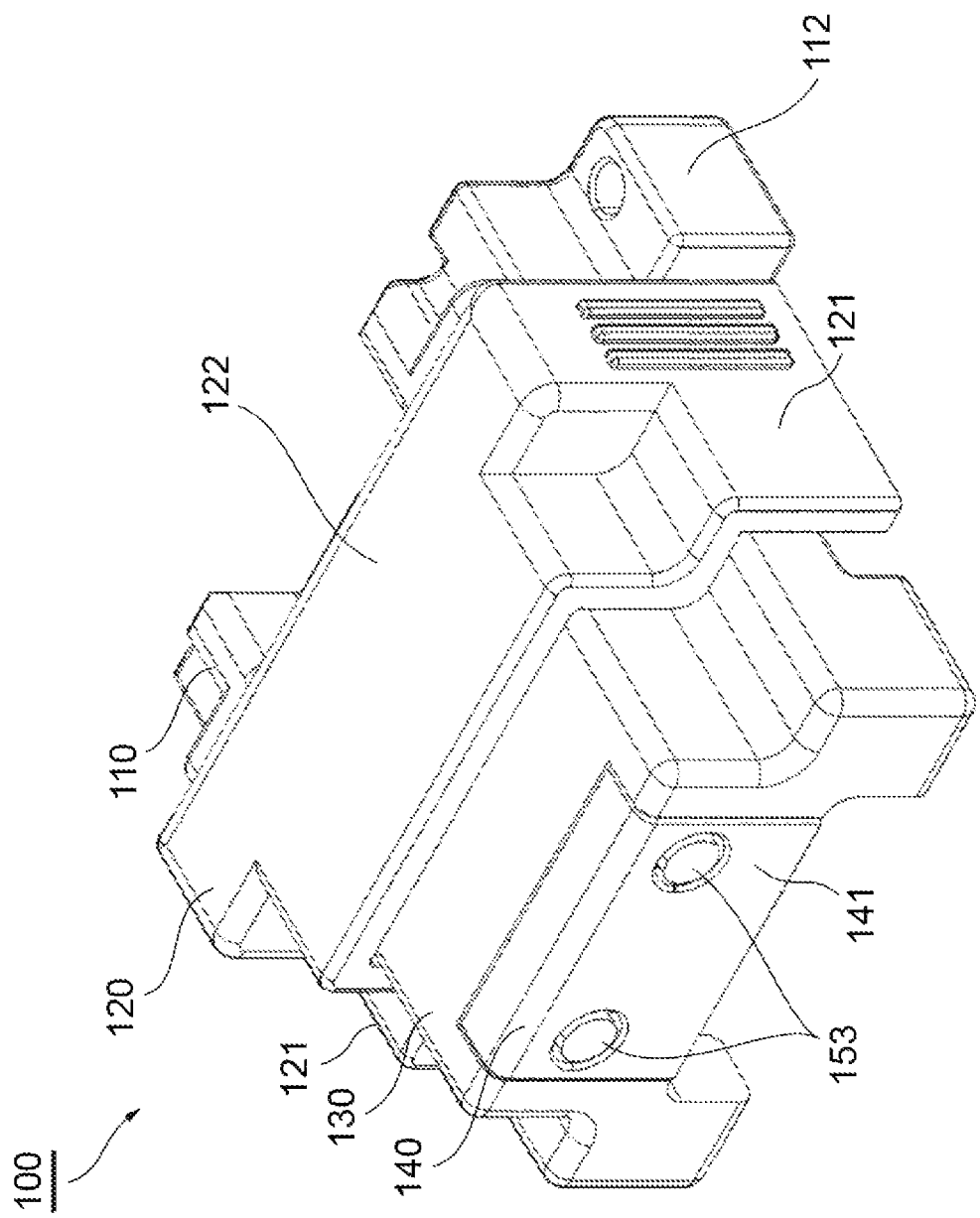
FIG. 6 is a perspective view showing an optical connector jig according to an embodiment.
Figure 7:
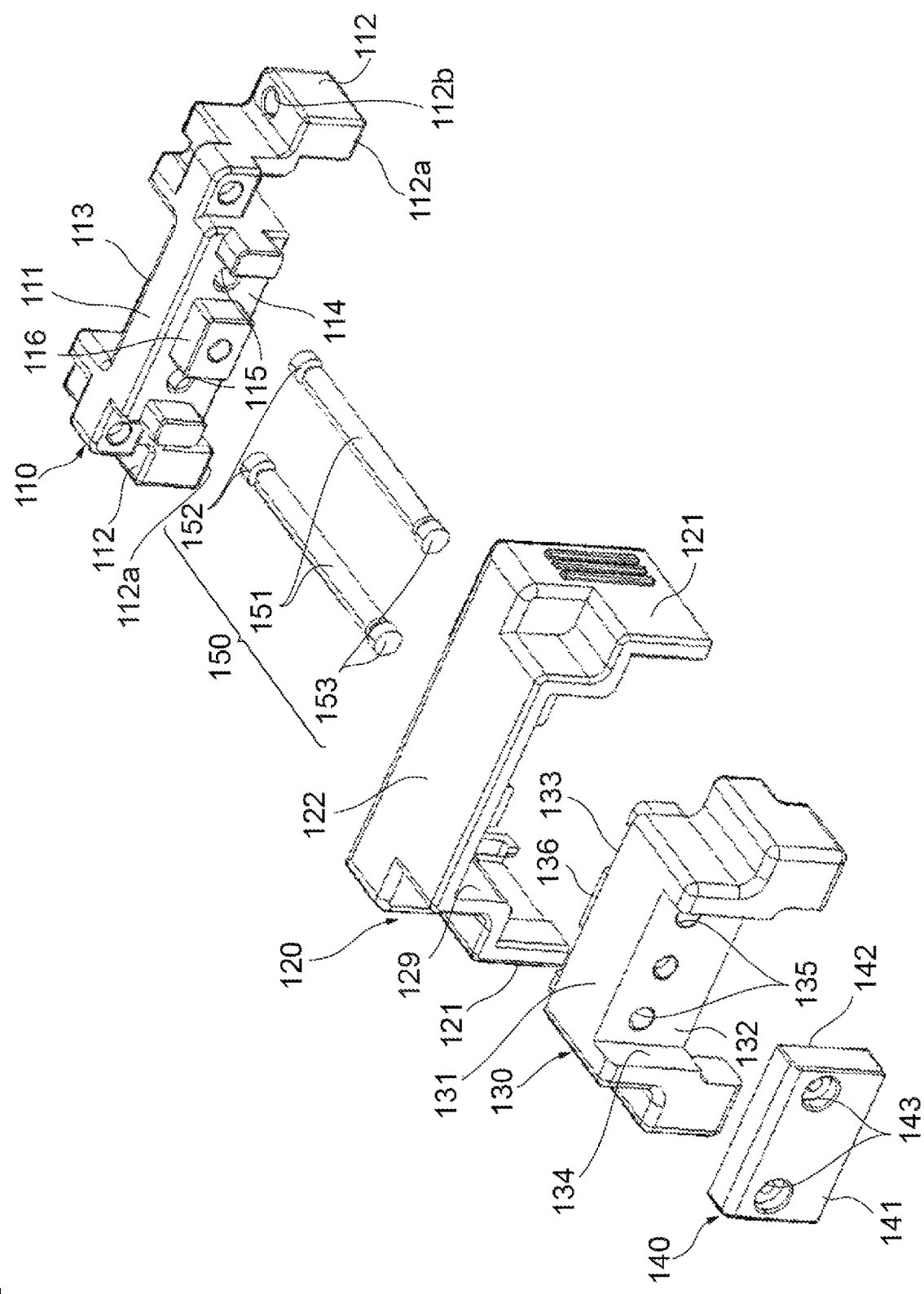
FIG. 7 is an exploded perspective view of the optical connector jig shown in FIG. 6.
Figure 8:
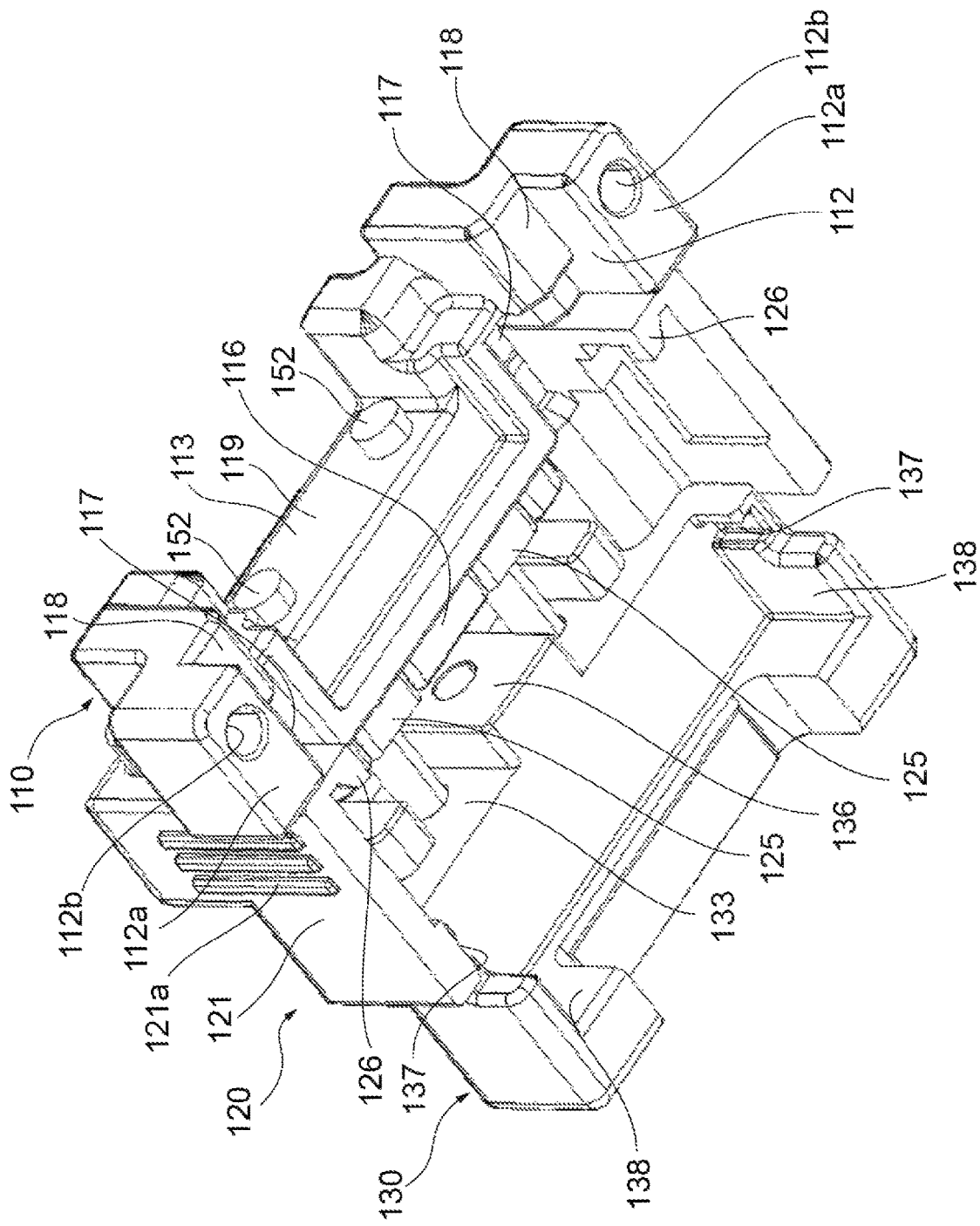
FIG. 8 is a perspective view of the optical connector jig shown in FIG. 6 from below.

Next, as described above, the optical connector jig 100 for connecting the second optical connector 60 to the first optical connector 40 and for disconnecting the second optical connector 60 connected to the first optical connector 40 from the first optical connector 40, will be described with reference to FIGS. 6 to 8. FIG. 6 is a perspective view showing the optical connector jig 100 according to an embodiment. FIG. 7 is an exploded perspective view of the optical connector jig 100. FIG. 8 is a perspective view of the optical connector jig 100 from below.

The optical connector jig 100 includes a first housing 110, an ejector 120, a second housing 130, a bearing part 140, and a shaft part 150, as shown in FIGS. 6 to 8. The optical connector jig 100 is attached to the first optical connector 40 and the second optical connector 60 to cover them from above, and is used to perform the above-described connecting and disconnecting works.

The first housing 110 includes a main body portion 111, a pair of positioning portions 112, an opening portion 113, a front end surface 114, a pair of through holes 115, a protruding portion 116, a pair of recesses 117, and a pair of shoulder portions 118 (protrusions). The first housing 110 is a member that receives the first optical connector 40 in the opening portion 113 and positions the optical connector jig 100 with respect to first optical connector 40 by the pair of positioning portions 112, the pair of recesses 117, and the pair of shoulder portions 118.

The main body portion 111 is a portion that extends in the width direction which is the same as a direction in which the main body portion of the first optical connector 40 extends. The pair of positioning portions 112 are provided at both ends of the main body portion 111. Each positioning portion 112 has a placing surface 112a on which the first housing 110 can be placed on the main surface 10a of the board 10 and a through hole 112b (a recess) that extends upward from the placing surface 112a to pass through the positioning portion 112. The placing surface 112a comes into contact with the main surface 10a when the optical connector jig 100 is placed on the board 10, and functions to maintain the optical connector jig 100 in a horizontal state. The positioning pin 11 provided on the board 10 is inserted into each through hole 112b, thereby the optical connector jig 100 is positioned with respect to the first optical connector 40.

The opening portion 113 is a portion between the pair of positioning portions 112 and opens at least on a side of each placing surface 112a and the rearward side. When the optical connector jig 100 is covered on the first optical connector 40, the first optical connector 40 is received in the opening portion 113 from below.

The front end surface 114 is a surface of the main body portion 111 close to the second housing 130 and faces a rear end surface 133 of the second housing 130. The front end surface 114 is provided with a pair of through holes 115 passing through rearward, and a protruding portion 116 located between the pair of through holes 115 and protruding toward the second housing 130. Each pin main body 151 constituting the shaft part 150 is inserted into one of the pair of through holes 115, and each pin main body 151 is prevented from slipping out of the through hole 115 by a first flange portion 152 located on a rear end of the through hole 115. The protruding portion 116 is configured to be located in a recess 123 of the ejector 120 and face a protruding portion 136 of the second housing 130 when the first housing 110 is attached to the second housing 130 with the ejector 120. The positioning of the first housing 110 with respect to the ejector 120 in the width direction is achieved with the protruding portion 116. Each region of the front end surface 114 divided into two regions by the protruding portion 116 comes into contact with a rear end surface of each of a pair of protruding portions 124 of the ejector 120, and thus the positioning of the first housing 110 with respect to the ejector 120 in the front-rear direction is achieved.

Figure 9:
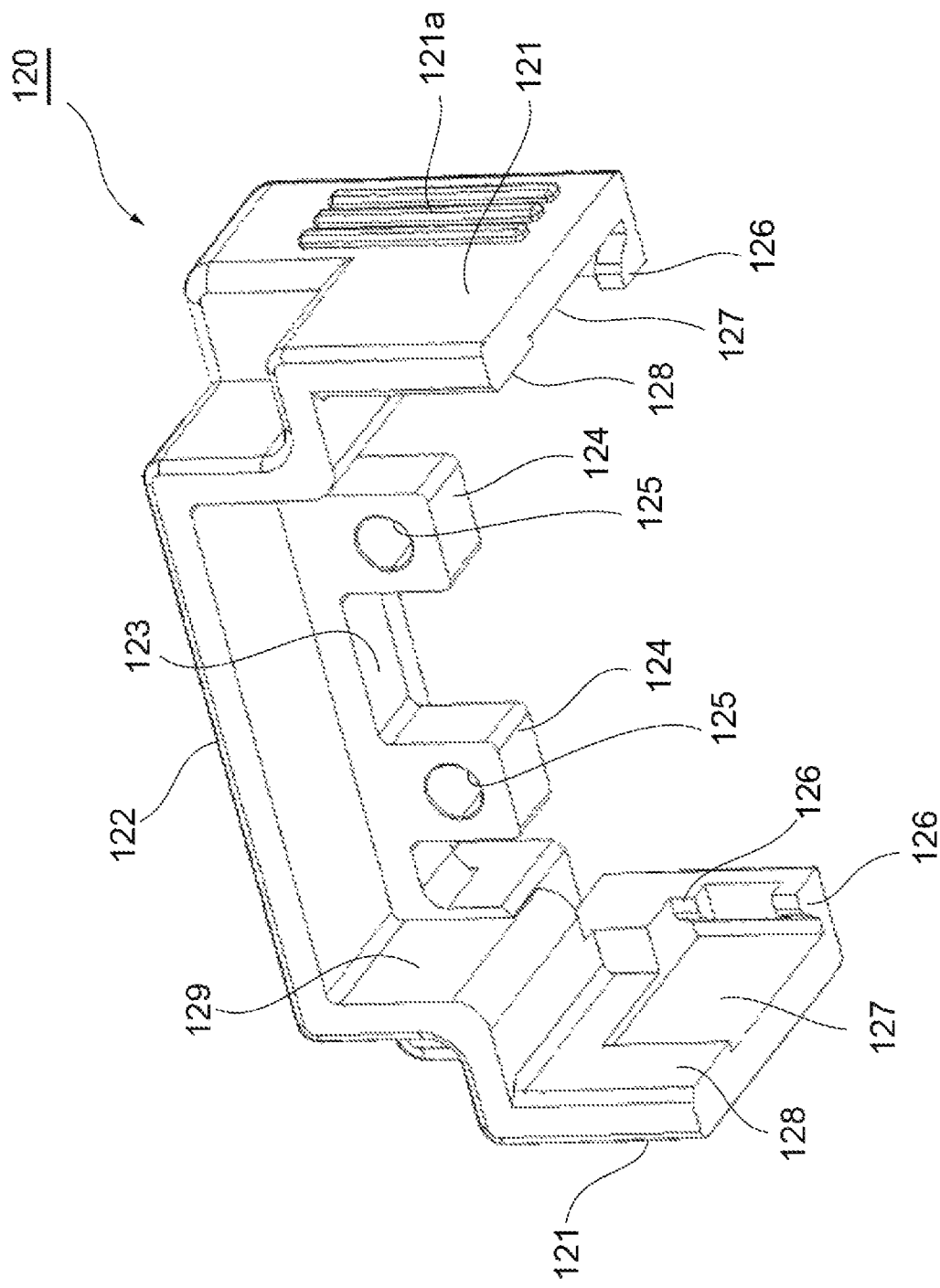
FIG. 9 is a perspective view of an ejector which is a component of the optical connector jig shown in FIG. 6 from below.

The ejector 120 is a member that is connected between the first housing 110 and the second housing 130 with the shaft part 150 to be slidable with respect to the first housing 110, and releases the connection between the first optical connector 40 and the second optical connector 60 by moving away from the first housing 110. FIG. 9 is a perspective view showing the ejector 120. As shown in FIG. 9, the ejector 120 includes a pair of side walls 121, a top plate 122, a recess 123, a pair of protruding portions 124, a pair of through holes 125, a pair of releasing portions 126, a pair of recesses 127, and a pair of pressing surface 128. A holding portion 121a may be provided on a side surface of each of the pair of side walls 121 for easily holding the ejector 120.

The pair of side walls 121 and the top plate 122 are portions that mainly form an outer shape of the ejector 120 and define an opening portion 129 that opens downward. The opening portion 129 is configured such that tip end portions of the first housing 110 and the second housing 130 can be disposed therein. The pair of protruding portions 124 each provided with the through hole 125 and the recess 123 defined by the pair of protruding portions 124 therebetween are provided inside the top plate 122. Each pin main body 151 of the shaft part 150 is inserted into each through hole 125. Since the ejector 120 is configured such that each pin main body 151 of the shaft part 150 is inserted into and passes through the through hole 125, the ejector 120 can slide along the pin main body 151 with respect to the first housing 110 or the second housing 130. The protruding portion 116 of the first housing 110 described above is received in the recess 123 to determine a positional relationship between the first housing 110 and the ejector 120 in the width direction.

The releasing portion 126 is a protruding portion that protrudes inside each of the pair of side walls 121 away from the first housing 110, that is, toward the second housing 130. The releasing portion 126 has an inclined surface on an outer side thereof. In a case where the second optical connector 60 is connected to the first optical connector 40, that is, in a case where the engaging portion 67 of the latch 66 of the second optical connector 60 is engaged with the recess 46 of the first optical connector 40, when the ejector 120 is moved away from the first housing 110, each releasing portion 126 enters a space between the engaging portion 67 and a bottom surface of the recess 46. When the protruding portion of the releasing portion 126 enters in this way, the engaging portion 67 is spread outward along the inclined surface of the protruding portion, and the engagement of the second optical connector 60 with the first optical connector 40 is released.

The pair of recesses 127 are provided inside each of the pair of side walls 121 and are configured to be recessed outward. The pressing surface 128 is provided on an edge of each of the pair of recesses 127, the edge being adjacent to the second housing 130. The pair of recesses 127 and the pair of pressing surfaces 128 support an engaging operation of the latches 66 when the second optical connector 60 is connected to the first optical connector 40. That is, when the second optical connector 60 is to be connected to the first optical connector 40, a tip end (the engaging portion 67 or the like) of the latch 66 can be freely curved outward within the recess 127 while an outer surface of the latch 66 on a base end is pressed by the pressing surface 128 not to bend outward. Such a configuration supports the engagement operation of the latches 66.

The second housing 130 is a member that can grip the second optical connector 60 such that the connection surface 64 of the second optical connector 60 faces the connection surface 44 of the first optical connector 40 when the optical connector jig 100 is positioned with respect to the first optical connector 40 (see FIG. 3). The second housing 130 includes a main body portion 131, a front end surface 132, a rear end surface 133, a recess 134, a pair of through holes 135, a protruding portion 136, and a pair of slits 137.

The front end surface 132 is provided in the main body portion 131 close to the bearing part 140, and the rear end surface 133 is provided in the main body portion 131 close to the first housing 110. The recess 134 is provided on the front end surface 132 of the main body portion 131, and the bearing part 140 is received in the recess 134. The pair of through holes 135 passing through the main body portion 131 from the front end surface 132 to the rear end surface 133 are provided in the main body portion 131. The rear ends of the pair of pin main bodies 151 of the shaft part 150 pass through the pair of through holes 135, and each pin main body 151 is attached to the bearing part 140 by a second flange portion 153. As a result, the second housing 130 can move along the shaft part 150 with respect to the first housing 110 or the ejector 120.

The protruding portion 136 is a portion that is provided substantially in a center of the rear end surface 133 in the width direction and protrudes toward the first housing 110. The protruding portion 136 is located between the pair of pin main bodies 151 of the shaft part 150 and is disposed to face the protruding portion 116 of the first housing 110 with a predetermined distance therebetween. In a case where the second housing 130 is moved toward the first housing 110 and the protruding portion 116 and the protruding portion 136 come into contact with each other, the second housing 130 cannot be moved with respect to the first housing 110 any further. That is, the protruding portion 116 and the protruding portion 136 function as stoppers.

The bearing part 140 includes a front end surface 141, a rear end surface 142, and a pair of through holes 143. The pair of through holes 143 are formed such that an inner diameter close to the front end surface 141 is larger than an inner diameter close to the rear end surface 142. By a front end portion of the pin main body 151 of the shaft part 150 being inserted into and passing through each of the pair of through holes 143, and by the second flange portion 153 with a larger diameter than the pin main body 151 being located in a large diameter portion of the through hole 143, the shaft part 150 is fixed to the bearing part 140. By both ends of each of the pair of pin main bodies 151 of the shaft part 150 being fixed to the bearing part 140 and the first housing 110, the ejector 120 or the second housing 130 is slidable with respect to the first housing 110 along the shaft part 150.

The shaft part 150 is a member for connecting the first housing 110 and the bearing part 140 to each other to make the ejector 120 or the second housing 130 disposed between the first housing 110 and the bearing part 140 slidable with respect to the first housing 110. As shown in FIG. 7, the shaft part 150 has the pin main body 151, the first flange portion 152, and the second flange portion 153. The pin main body 151 is formed in a substantially circular column shape. The first flange portion 152 is attached to a front end of the pin main body 151 after the pin main body 151 passes through the through hole 115 of the first housing 110. The second flange portion 153 is attached to a rear end of the pin main body 151 after the pin main body 151 passes through the through hole 143 of the bearing part 140. The first flange portion 152 and the second flange portion 153 are detachable from the pin main body 151.

Here, a method of disposing the ejector 120 and the second housing 130 between the first housing 110 and the bearing part 140 by the shaft part 150 and connecting the members to each other will be described. First, the pin main body 151 is inserted into and passes through the through hole 115 of the first housing 110, the through hole 125 of the ejector 120, the through hole 135 of the second housing 130, and the through hole 143 of the bearing part 140 in a state where the first flange portion 152 and the second flange portion 153 are not attached thereto. After that, the first flange portion 152 is attached to an end portion of the pin main body 151 protruding from the through hole 115 of the first housing 110. On the other hand, the second flange portion 153 is attached to an end portion of the pin main body 151 protruding outward from the through hole 143 of the bearing part 140.

An outer diameter of the first flange portion 152 is larger than an inner diameter of the through hole 115 of the first housing 110. Therefore, the first flange portion 152 is located to come into contact with a rear end surface 119 of the first housing 110 (see FIG. 8). Further, an outer diameter of the second flange portion 153 is smaller than the inner diameter of the through hole 143 close to the front end surface 141, but larger than the inner diameter of the through hole 143 close to the rear end surface 142. Therefore, the second flange portion 153 is positioned inside the through hole 143 of the bearing part 140 (see FIG. 6). Due to the first flange portion 152 and the second flange portion 153, the first housing 110, the ejector 120, the second housing 130, and the bearing part 140 are prevented from slipping out of the end portion of the shaft part 150.

Figure 10:
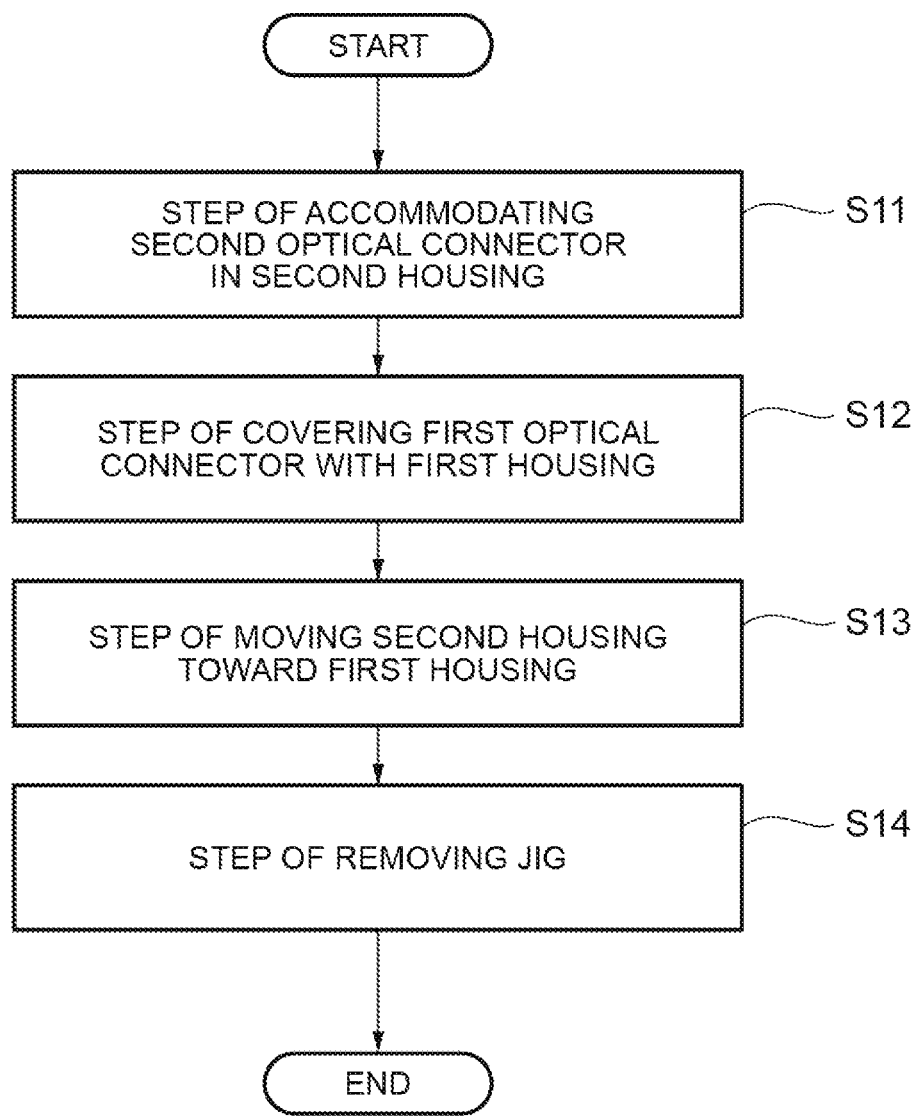
FIG. 10 is a flowchart showing a method of connecting the second optical connector to the first optical connector.
Figure 11A:
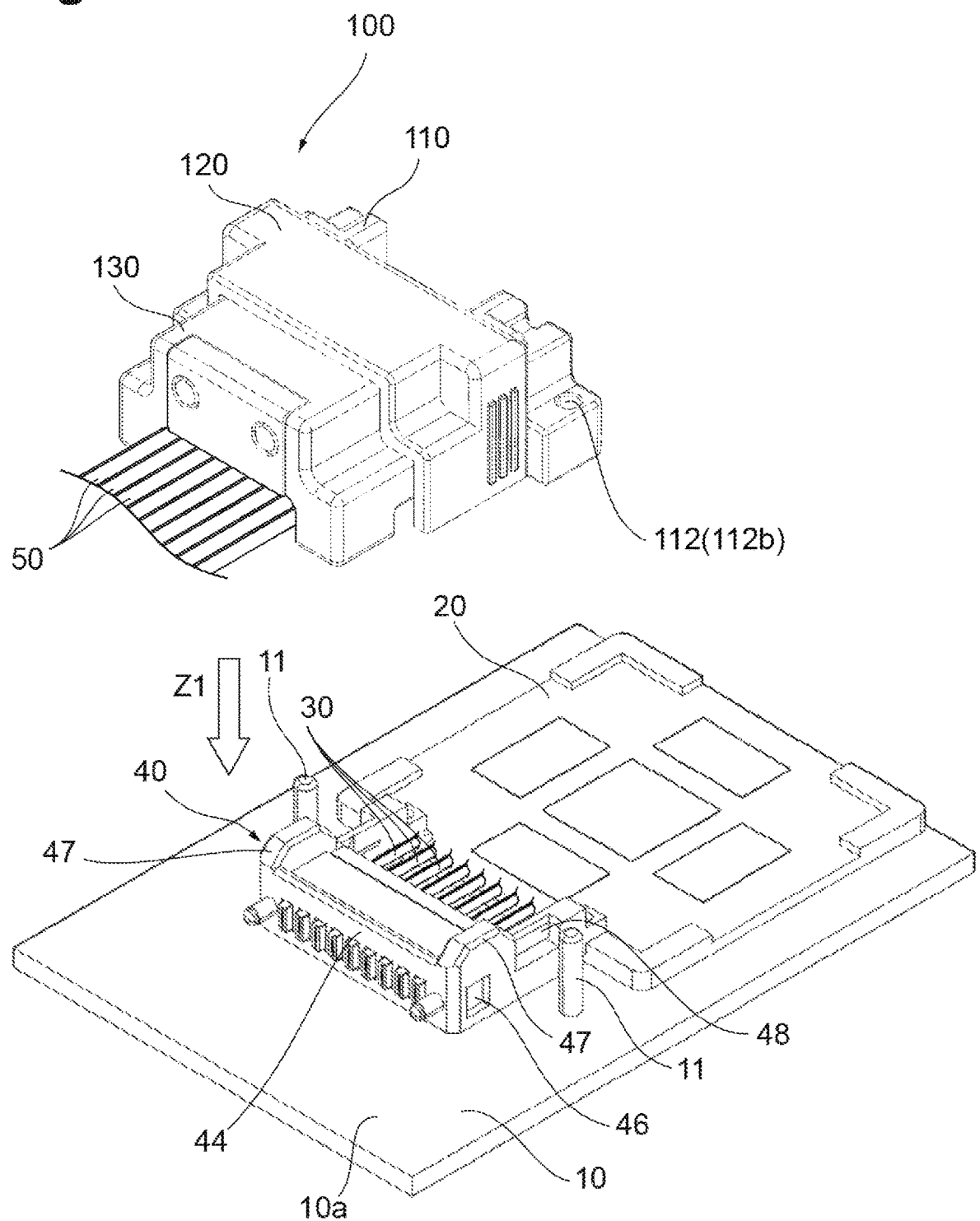
FIG. 11A is a perspective view showing a state in which the optical connector jig gripping the second optical connector is positioned with respect to a first housing.
Figure 11B:
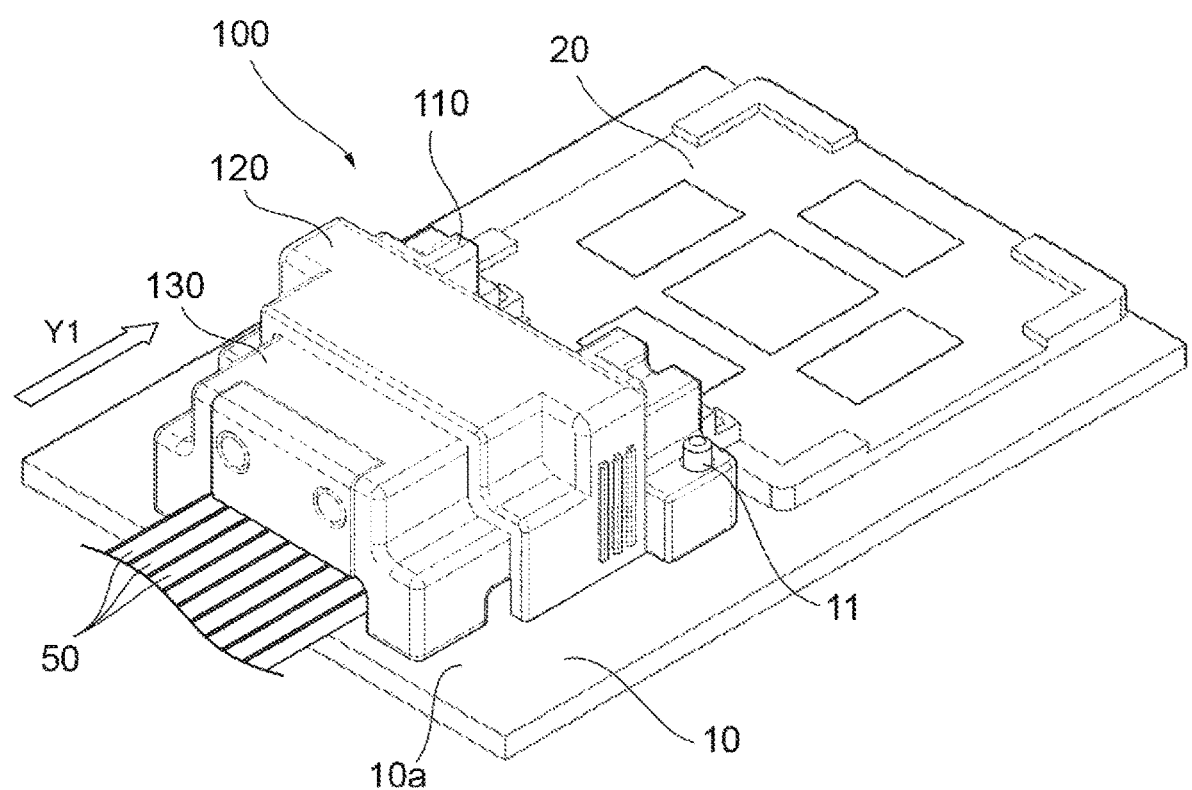
FIG. 11B is a perspective view showing a state in which a second housing is moved toward the first housing and connected after the positioning shown in FIG. 11A.
Figure 11C:
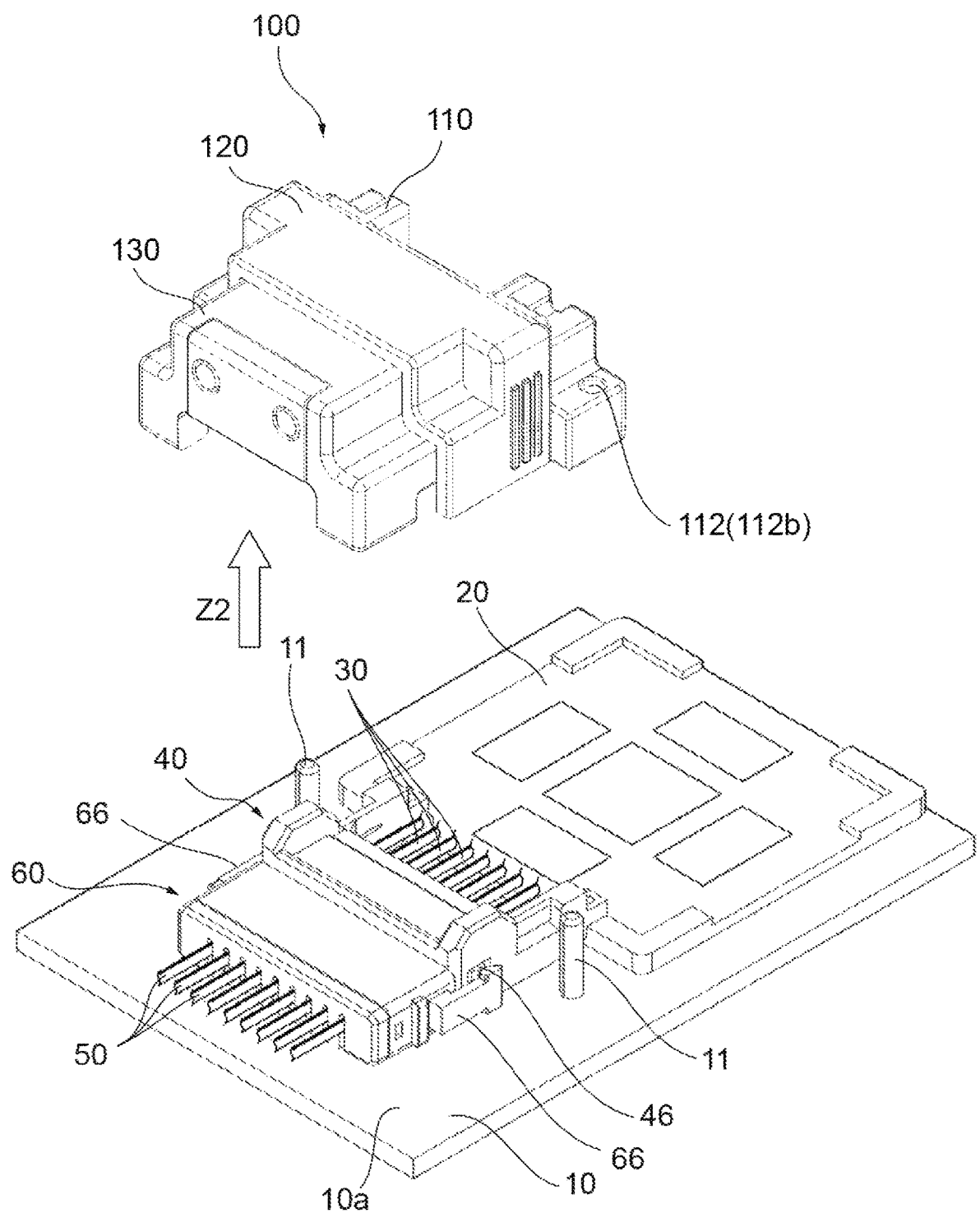
FIG. 11C is a perspective view showing a state in which the optical connector jig is removed after the connection shown in FIG. 11B.

Next, a method of connecting the first optical connector 40 and the second optical connector 60 to each other by using the optical connector jig 100 will be described with reference to FIGS. 10 and 11A to 11C. FIG. 10 is a flowchart showing a method of connecting the first optical connector 40 and the second optical connector 60 to each other. FIG. 11A is a view showing a manner in which the first optical connector 40 is covered with the first housing 110. FIG. 11B is a view showing a manner in which the second housing 130 is moved toward the first housing 110. FIG. 11C is a view showing a manner in which the optical connector jig 100 is removed.

First, as shown in FIG. 11A, the second optical connector 60 is accommodated and gripped in an opening portion 138 of the second housing 130 (Step S11). Specifically, the second optical connector 60 is gripped by the second housing 130 such that the connection surface 64 of the second optical connector 60 faces the connection surface 44 of the first optical connector 40 when the optical connector jig 100 is positioned with respect to the first optical connector 40 (see FIG. 3). This gripping is performed by press-fitting each protruding portion 63 of the second optical connector 60 into the slit 137 of the second housing 130. Since the second optical connector 60 is press-fitted into the second housing 130, the second optical connector 60 is prevented from falling off the second housing 130.

Next, the optical connector jig 100 is moved from above the board 10 toward the main surface 10a (in a direction of arrow Z1 in FIG. 11A) to cover the first optical connector 40 with the first housing 110 (Step S12). At this time, the optical connector jig 100 is moved in a state where the opening portion 113 of the first housing 110 is opened toward the main surface 10a of the board 10. Accordingly, the first optical connector 40 is accommodated inside the first housing 110 through the opening portion 113. The pair of positioning pins 11 are provided on the main surface 10a of the board 10. When the first optical connector 40 is covered with the first housing 110, the optical connector jig 100 is positioned such that the pair of pins 11 are inserted into and pass through the through holes 112b of the positioning portion 112 of the first housing 110 (See FIG. 11B). In this positioning, the protrusion 47 and the recess 48 may be used to assist with the positioning.

Next, the second housing 130 is moved toward the first housing 110 (Step S13). Specifically, the second housing 130 is moved along the shaft part 150 toward the first housing 110 (in the direction of arrow Y1 in FIG. 11B). Then, the second optical connector 60 gripped by the second housing 130 approaches the first optical connector 40 accommodated and fixed in the first housing 110. Then, as shown in FIG. 11C, the engaging portion 67 formed at the tip end of the latch 66 of the second optical connector 60 is engaged with the recess 46 of the first optical connector 40, and the first optical connector 40 and the second optical connector 60 are connected to each other. In this connection, the tip end of the ferrule 31 received in the first optical connector 40 and the tip end of the ferrule 51 received in the second optical connector 60 are separated by a predetermined distance and optically coupled with each other, but both ends may come into direct contact with each other and be optically coupled with each other.

After that, the optical connector jig 100 is removed from the first optical connector 40 and the second optical connector 60 (Step S14). Specifically, the optical connector jig 100 is moved away from the main surface 10a of the board 10 (in a direction of arrow Z2 in FIG. 11C) to be removed from the optical connectors. Since the second housing 130 is configured to be movable by a predetermined distance with respect to the first housing 110, the upward movement described above is not hindered. As described above, a process of connecting the first optical connector 40 and the second optical connector 60 to each other using the optical connector jig 100 ends.

Figure 12:
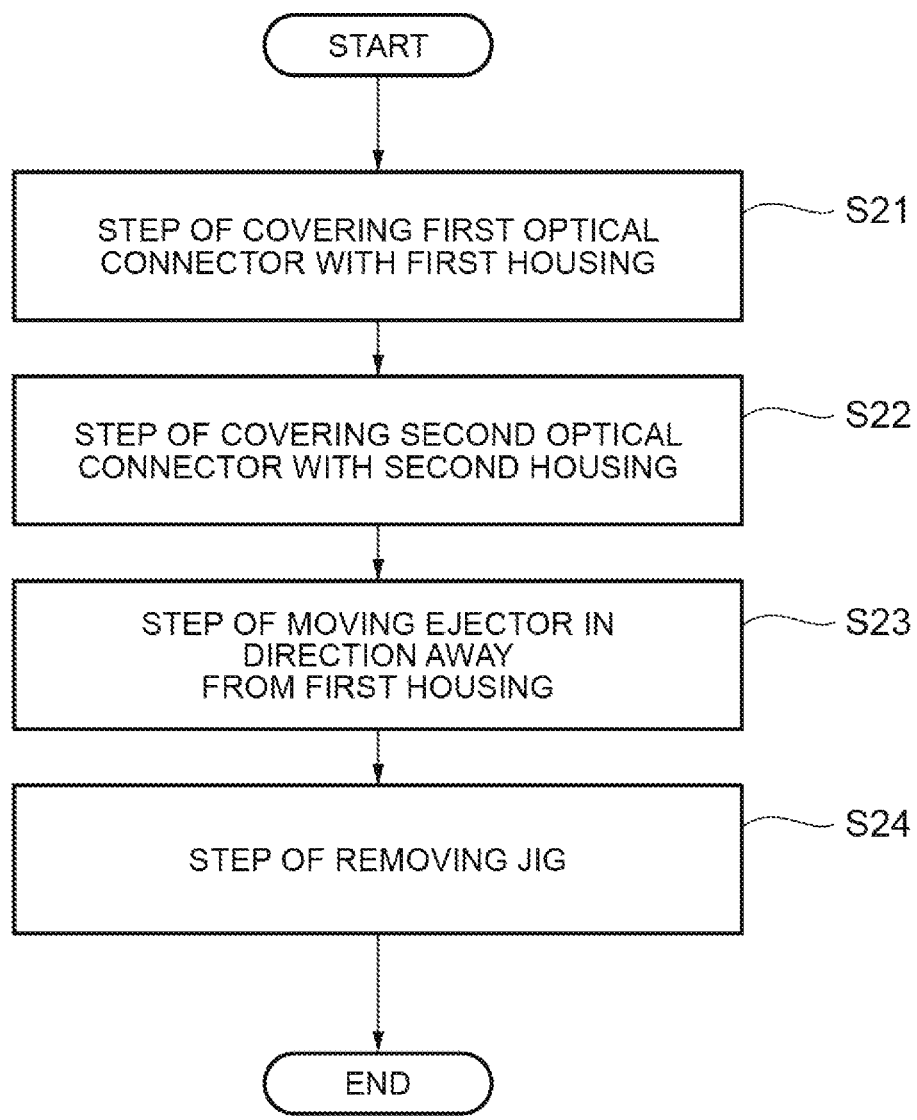
FIG. 12 is a flowchart showing a method of disconnecting the second optical connector from the first optical connector.
Figure 13A:
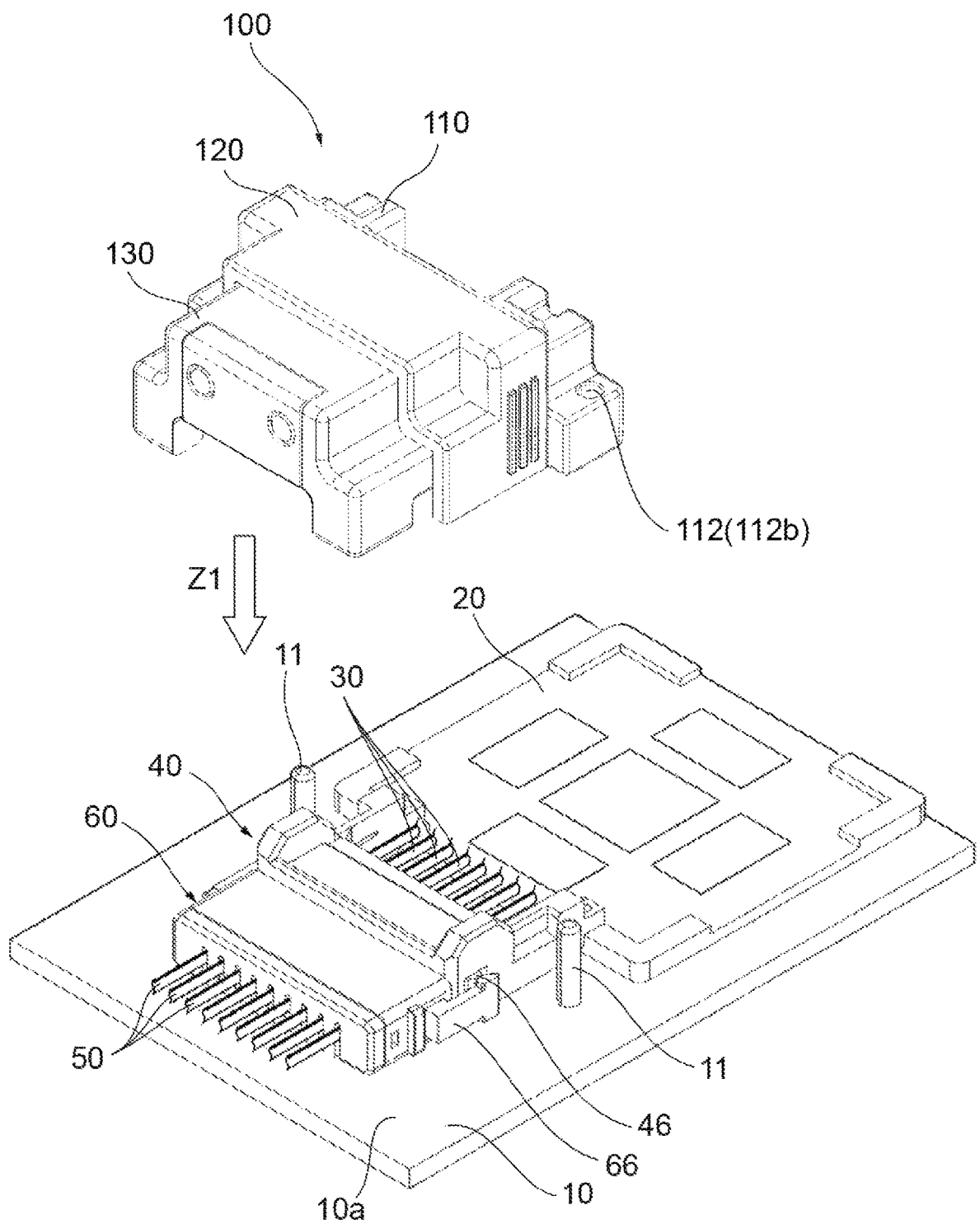
FIG. 13A is a view showing a manner in which the optical connector jig is attached to the first optical connector and the second optical connector.
Figure 13B:
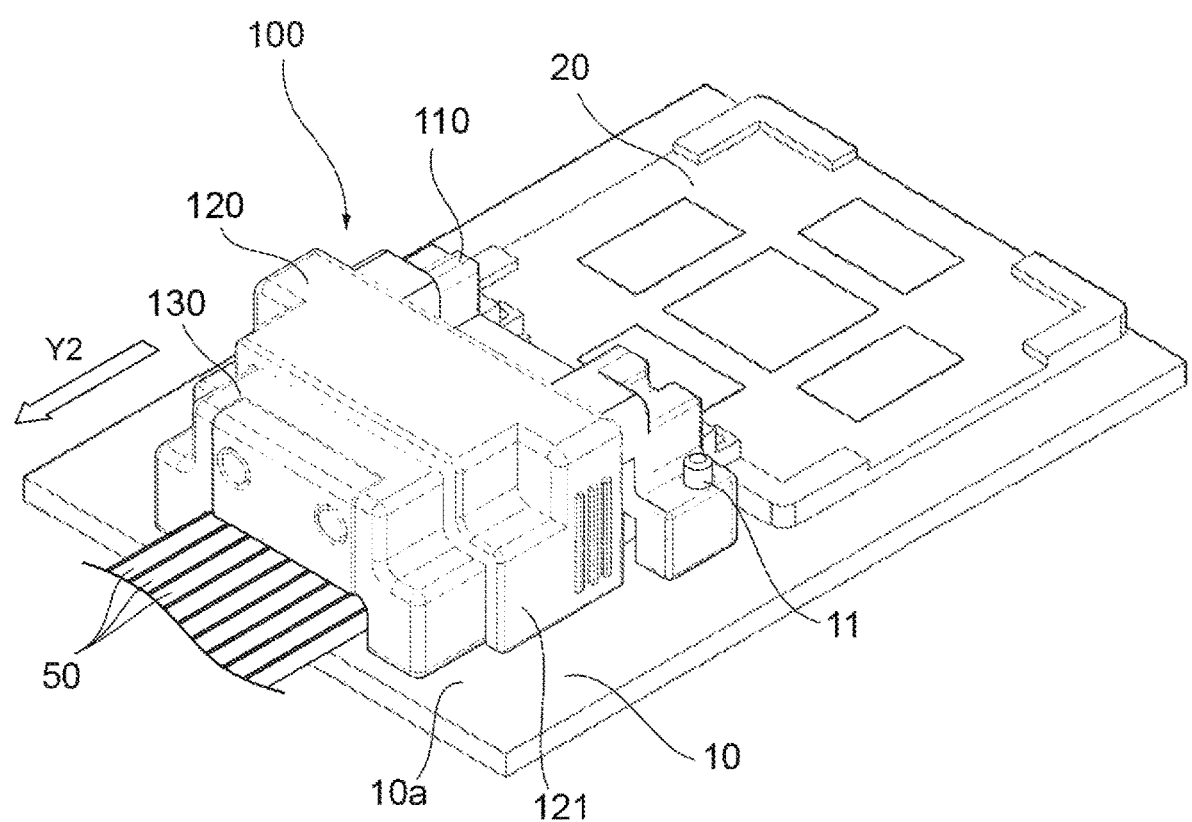
FIG. 13B is a view showing a state in which an ejector which is a component of the optical connector jig is moved away from the first housing after the positioning.
Figure 13C:
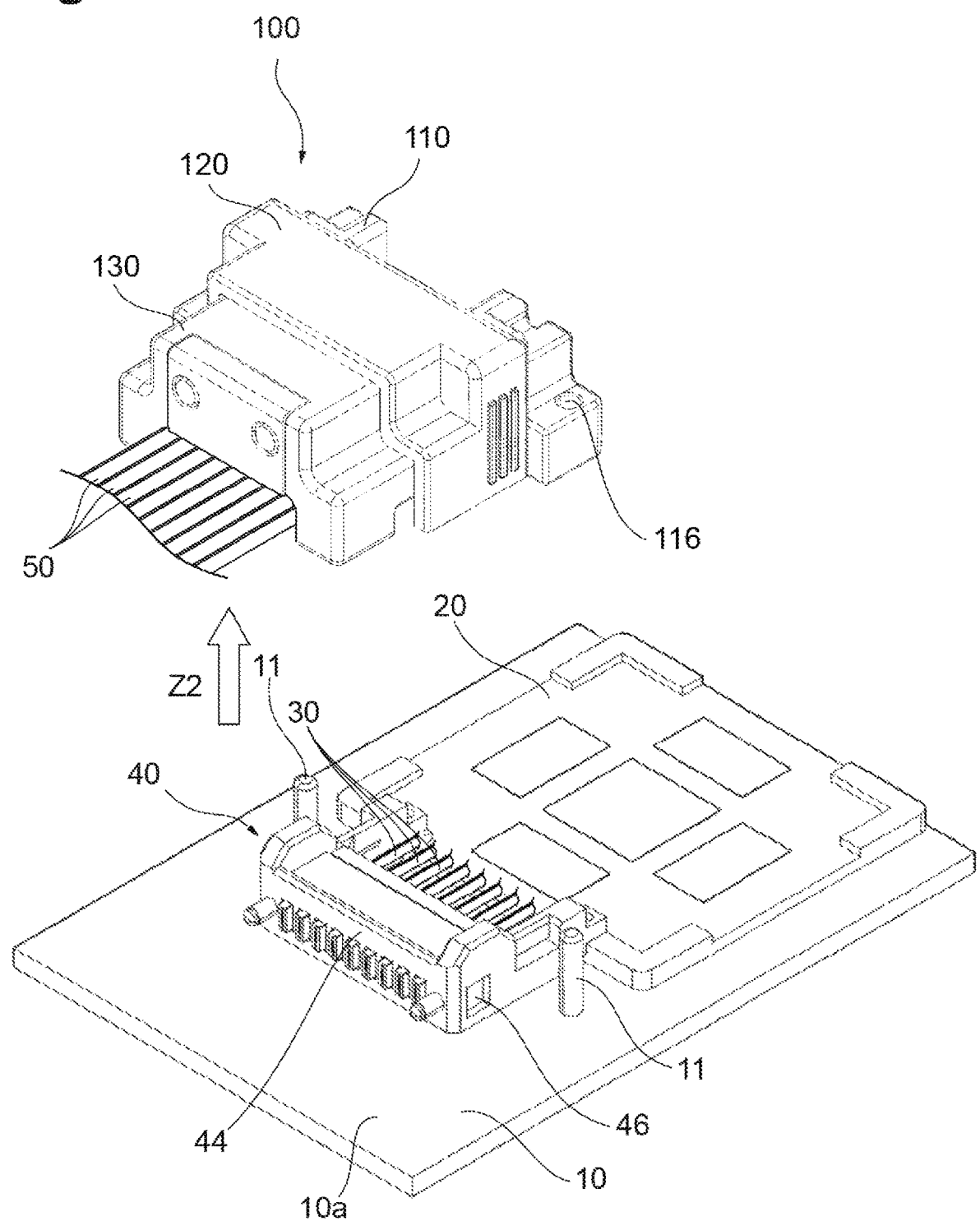
FIG. 13C is a view showing a manner in which the optical connector jig is removed after the second optical connector shown in FIG. 13B is disconnected.

Next, a method of releasing the connection between the first optical connector 40 and the second optical connector 60 (a disconnection method) by using the optical connector jig 100 will be described with reference to FIGS. 12 and 13A to 13C. FIG. 12 is a flowchart showing a method of disconnecting the second optical connector 60 connected to the first optical connector 40. FIG. 13A is a view showing a manner in which the optical connector jig 100 is attached to the first optical connector 40 and the second optical connector 60 connected to each other. FIG. 13B is a view showing a manner in which the ejector 120 is moved away from the first housing 110. FIG. 13C is a view showing a manner in which the optical connector jig 100 is removed.

First, the optical connector jig 100 is moved from above the board 10 toward the main surface 10a (in a direction of arrow Z1 in FIG. 13A) to cover the first optical connector 40 with the first housing 110 (Step S21). At this time, the optical connector jig 100 is moved downward in a state where the opening portion 113 of the first housing 110 is opened toward the main surface 10a of the board 10. Accordingly, the first optical connector 40 is accommodated inside the first housing 110 through the opening portion 113. In this accommodation, each pin 11 is inserted into and passes through the through hole 112b of the positioning portion 112 of the first housing 110, and thus the optical connector jig 100 is positioned with respect to the first optical connector 40.

In parallel with Step S21, a step of covering the second optical connector 60 with the second housing 130 (step S22) is performed. Specifically, the second housing 130 covers the second optical connector 60 in a state where the opening portion 138 opens toward the main surface 10a of the board 10. Therefore, the second optical connector 60 is accommodated inside the second housing 130 through the opening portion 138. In this accommodation, the protruding portion 63 of the second optical connector 60 is press-fitted into the slit 137 of the second housing 130. As a result, the second optical connector 60 is gripped by the second housing 130.

Next, the ejector 120 is moved away from the first housing 110, that is, toward the second housing 130 (Step S23). Specifically, the ejector 120 is moved along the shaft part 150 away from the first housing 110 (in a direction of arrow Y2 in FIG. 13B). Then, the releasing portion 126 (see FIG. 9) provided on an inner surface of the side wall 121 of the ejector 120 enters the engaged portion between the latch 66 of the second optical connector 60 and the recess 46 of the first optical connector 40 (see FIG. 13A), and the engagement is released.

After that, the optical connector jig 100 is removed upward from the first optical connector 40 (Step S24), and the connection between the first optical connector 40 and the second optical connector 60 is released. Specifically, the optical connector jig 100 is moved away from the main surface 10a of the board 10 (in a direction of arrow Z2 in FIG. 11C). At this time, the second optical connector 60 is gripped by the second housing 130 of the optical connector jig 100. As described above, a process of disconnecting the second optical connector 60 connected to the first optical connector 40 using the optical connector jig 100 ends.

As described above, in the optical connector jig 100 according to the present embodiment, the first housing 110 has the pair of positioning portions 112 to position the optical connector jig 100 with respect to the first optical connector 40, and the second housing 130 gripping the second optical connector 60 can be moved with respect to the first housing 110 such that the connection surface 64 of the second optical connector 60 is close to the connection surface 44 of the first optical connector 40 or is away from the connection surface 44 of the first optical connector 40. Therefore, simply by gripping the second optical connector 60 with the second housing 130 and positioning the optical connector jig 100 and then moving the second housing 130 with respect to the first housing 110, it is possible to connect the second optical connector 60 to the first optical connector 40 or to disconnect the second optical connector 60 from the first optical connector 40. Therefore, by using the optical connector jig 100, it is possible to easily connect the second optical connector 60 to the first optical connector 40 as compared with the case where the first optical connector 40 and the second optical connector 60 disposed on the main surface 10a of the board 10 are directly gripped by hand or the like to be connected to each other.

In the above-described embodiment, each positioning portion 112 includes the through hole 112b corresponding to the pin 11 that is provided on at least one of the board 10 and the first optical connector 40 and is the member indicating a position of the first optical connector. Therefore, the pair of positioning portions 112 can be realized with a simpler configuration. Each positioning portion 112 includes the placing surface 112a on which the first housing 110 can be placed on the main surface 10a of the board 10, and the positioning through hole 112b is provided in the placing surface 112a. Therefore, by bringing the main surface 10a of the board 10 and each placing surface 112a into face-to-face contact with each other, it is possible to adjust the inclination of the optical connector jig 100 in the horizontal direction with respect to the board 10 and to more accurately position the optical connector jig 100 with respect to the first optical connector 40. A configuration in which each positioning portion 112 is provided with a protrusion and the board 10 or the like is provided with a recess corresponding to the protrusion to position the optical connector jig 100 with respect to the first optical connector 40 may be adopted.

In the above-described embodiment, the first housing 110 is provided with the opening portion 113 that can receive the first optical connector 40, and the pair of recesses 117 that can accommodate the pair of protrusions 47 of the first optical connector 40 and the pair of shoulder portions 118 that can be accommodated in the pair of recesses 48 of the first optical connector are formed in the opening portion 113. Therefore, the first housing 110 of the optical connector jig 100 can receive a force applied to the first optical connector 40 when the second optical connector 60 is moved closer to the first optical connector 40 by the second housing 130 of the optical connector jig 100, and thus a force applied the connection portion between the first optical connector 40 and the board 10 or the package 20 can be dispersed to protect the installation of the first optical connector 40 on the board 10, the package 20, or the like. According to the above-described configuration, it assists a positioning work that is performed mainly by the pin 11, which is the member indicating the position of the first optical connector 40, and the through hole 112b of the positioning portion 112 of the first housing 110, and thus it is possible to perform the positioning more accurately or an positioning operation more smoothly.

In the above-described embodiment, the optical connector jig 100 further includes the shaft part 150 having one end fixed to the first housing 110 and passing through the second housing 130 toward the other end opposite to the one end, and the bearing part 140 to which the other end of the shaft part 150 is fixed. The second housing 130 is slidable relative to the first housing 110 along the shaft part 150 between the first housing 110 and the bearing part 140. Therefore, the movement of the second housing 130 with respect to the first housing 110 can be made smooth along the shaft part 150, and the second optical connector 60 can be more easily connected to the first optical connector 40. Since the second optical connector 60 can be connected to the first optical connector 40 along the shaft part 150, it is possible to reduce connection loss due to optical axis misalignment occurring when the optical cables are optically connected to each other.

In the above-described embodiment, the optical connector jig 100 further includes the ejector 120 disposed between the first housing 110 and the second housing 130, and the ejector 120 has the releasing portion 126 that can release the connection between the first optical connector 40 and the second optical connector 60 by moving away from the first housing 110. Therefore, it is possible to easily disconnect the second optical connector 60 connected to the first optical connector 40 from the first optical connector 40 by using this releasing portion 126 without directly gripping the first optical connector 40 or the second optical connector 60 disposed on the main surface 10a for operating.

In the above-described embodiment, the ejector 120 has the pair of side walls 121 facing each other, and the pair of releasing portions 126 are provided inside the pair of side walls 121 near the first housing 110. Each releasing portion 126 is each of the pair of protrusions protruding away from the first housing 110. Therefore, by moving the ejector 120 away from the first housing 110 (toward the second housing 130), the pair of protrusions, which are the releasing portions 126, enter the engaged portion between the first optical connector 40 and the second optical connector 60 to release the engagement, as a result, it is possible to easily disconnect the second optical connector 60 connected to the first optical connector 40 from the first optical connector 40. By forming the releasing portions 126 from the pair of protrusions, it is possible to disconnect the optical connector with a simple structure.

In the above-described embodiment, each of the pair of side walls 121 of the ejector 120 has the recess 127 that is recessed outward and the pressing surface 128 located at the edge of the recess 127, the edge being close to the second housing 130. Therefore, when connecting the second optical connector 60 to the first optical connector 40, it becomes easier to temporarily spread the latch 66 of the second optical connector 60 outward. Therefore, the second optical connector 60 can be connected to the first optical connector 40 more smoothly.

In the optical connector connection method according to the present embodiment, the second optical connector 60 is gripped by the second housing 130 to face in a predetermined direction, and the optical connector jig 100 is positioned with respect to the first optical connector 40. After such setting is made, by moving the second housing 130 toward the first housing 110, the optical connectors are connected to each other. Therefore, it is possible to easily connect the optical connectors (that is, the optical fibers or the optical cables) to each other by operating the first housing 110 and the second housing 130 without directly gripping the first optical connector 40 or the second optical connector 60 disposed on the main surface 10a for operating.

Further, in the optical connector disconnection method according to the present embodiment, by moving the ejector 120 away from the first housing 110, the releasing portion 126 of the ejector 120 releases the engagement between the first optical connector 40 and the second optical connector 60. Therefore, the separation of the first optical connector 40 and the second optical connector 60 does not require a complicated work, and the connection between the optical connectors can be easily released and disconnected.

Although the embodiment according to the present disclosure is described in detail above, the present invention is not limited to the above embodiment and can be applied to various embodiments.

REFERENCE SIGNS LIST

1 Optical apparatus
10 Board
10a Main surface
11 Pin
20 Package
21 Integrated circuit
22 Optical device
30 First optical cable
31 Ferrule
32 Elastic member
40 First optical connector
41 Main body portion
42 Fitting portion
43 Leg portion
44 Connection surface
45 Pin
46 Recess
47 Protrusion
48 Recess
50 Second optical cable
51 Ferrule
52 Elastic member
60 Second optical connector
61 Main body portion 62 Fitting portion
63 Protruding portion
64 Connection surface
65 Hole
66 Latch
67 Engaging portion
100 Optical connector jig
110 First housing
111 Main body portion
112 Positioning portion
112a Placing surface
112b Through hole
113 Opening portion
114 Front end surface
115 Through hole
116 Protruding portion
117 Recess
118 Shoulder portion
119 Rear end surface
120 Ejector
121 Side wall
122 Top plate
123 Recess
124 Protruding portion
125 Through hole
126 Releasing portion
127 Recess
128 Pressing surface
129 Opening portion
130 Second housing
131 Main body portion
132 Front end surface
133 Rear end surface
134 Recess
135 Through hole
136 Protruding portion
137 Slit
140 Bearing part
141 Front end surface
142 Rear end surface
143 Through hole
150 Shaft part
151 Pin main body
152 First flange portion
153 Second flange portion

The invention claimed is:

1. An optical connector jig for connecting a second optical connector to which a tip end portion of at least one second optical cable is attached to a first optical connector which is disposed on a main surface of a board and to which a tip end portion of at least one first optical cable is attached, or disconnecting the second optical connector connected to the first optical connector from the first optical connector, the optical connector jig comprising:
a first housing including a positioning portion configured to determine a position of the optical connector jig with respect to the first optical connector in cooperation with a member indicating a position of the first optical connector;
a second housing configured to grip the second optical connector such that, when the optical connector jig is positioned with respect to the first optical connector, a connection surface of the second optical connector faces a connection surface of the first optical connector; and
an ejector disposed between the first housing and the second housing,
wherein the second housing is configured to move with respect to the first housing such that the connection surface of the gripped second optical connector is close to the connection surface of the first optical connector or is away from the connection surface of the first optical connector, and
wherein the ejector includes a releasing portion configured to release the connection between the first optical connector and the second optical connector by the ejector being moved away from the first housing.

2. The optical connector jig according to claim 1, wherein the positioning portion includes a hole or a protrusion corresponding to a protrusion or a hole that is provided on at least one of the board and the first optical connector and is the member indicating a position of the first optical connector.

3. The optical connector jig according to claim 2, wherein the positioning portion includes a placing surface on which the first housing is able to be placed on the main surface of the board, and the corresponding hole or protrusion is provided on the placing surface.

4. The optical connector jig according to claim 1,
wherein the first housing is provided with an opening portion configured to receive at least a part of the first optical connector, and
wherein the opening portion has at least one of (i) a recess configured to accommodate a protrusion of the first optical connector and (ii) a protrusion configured to be accommodated in a recess of the first optical connector.

5. The optical connector jig according to claim 1, further comprising:
a shaft part including one end fixed to the first housing and penetrating the second housing toward the other end opposite to the one end; and
a bearing part to which the other end of the shaft part is fixed,
wherein the second housing is slidable relative to the first housing along the shaft part between the first housing and the bearing part.

6. The optical connector jig according to claim 1,
wherein the ejector includes a pair of side walls facing each other, and the releasing portion is provided inside each of the pair of side walls adjacent to the first optical connector, and
wherein the releasing portion is each of a pair of protrusions protruding away from the first housing.

7. The optical connector jig according to claim 1,
wherein the ejector includes a pair of side walls facing each other, and
wherein each of the pair of side walls includes a recess recessed outward and a pressing surface located at an edge of the recess, the edge being adjacent to the second housing.

8. An optical connector connection method for connecting the second optical connector to the first optical connector by using the optical connector jig according to claim 1, the method comprising:
gripping the second optical connector by the second housing such that the connection surface of the second optical connector faces the first housing;
positioning the optical connector jig with respect to the first optical connector using the positioning portion of the first housing and the member indicating a position of the first optical connector; and
moving the second housing toward the first housing to connect the second optical connector to the first optical connector.

9. An optical connector disconnection method for disconnecting the second optical connector connected to the first optical connector from the first optical connector by using the optical connector jig according to claim 1, the method comprising:
  positioning the optical connector jig with respect to the first optical connector by using the positioning portion of the first housing and the member indicating a position of the first optical connector and gripping the second optical connector connected to the first optical connector by the second housing; and
  releasing the connection between the first optical connector and the second optical connector with the releasing portion by moving the ejector away from the first housing.

* * * * *